(12) United States Patent
Leppert et al.

(10) Patent No.: US 9,004,884 B2
(45) Date of Patent: Apr. 14, 2015

(54) IN-TANK FLUID TRANSFER ASSEMBLY

(75) Inventors: Kevin L. Leppert, Lanexa, VA (US); Jason D. Keown, Williamsburg, VA (US)

(73) Assignee: Synerject LLC, Newport News, VA (US)

( * ) Notice: Subject to any disclaimer, the term of this patent is extended or adjusted under 35 U.S.C. 154(b) by 479 days.

(21) Appl. No.: 13/414,780

(22) Filed: Mar. 8, 2012

(65) Prior Publication Data

US 2013/0061939 A1 Mar. 14, 2013

Related U.S. Application Data

(60) Provisional application No. 61/450,275, filed on Mar. 8, 2011.

(51) Int. Cl.
*F16N 37/00* (2006.01)

(52) U.S. Cl.
CPC ..................... *F16N 37/00* (2013.01)

(58) Field of Classification Search
CPC .............................. F04B 35/045; F16N 37/00
USPC ......... 137/565.17; 417/270, 417, 423.15, 553
See application file for complete search history.

(56) References Cited

U.S. PATENT DOCUMENTS

| | | | |
|---|---|---|---|
| 1,625,789 A * | 4/1927 | Braselton et al. ........ | 137/565.17 |
| 1,661,359 A * | 3/1928 | Walters et al. ................ | 417/417 |
| 2,091,499 A * | 8/1937 | Brown ..................... | 137/565.17 |
| 2,369,282 A * | 2/1945 | Curtis et al. ............. | 417/423.11 |
| 2,984,187 A * | 5/1961 | Prasse et al. ............. | 137/565.17 |
| 3,181,194 A * | 5/1965 | Daykin et al. ................ | 417/417 |
| 3,507,263 A | 4/1970 | Long | |
| 3,515,167 A * | 6/1970 | Svenson ................... | 137/565.17 |
| 4,860,714 A | 8/1989 | Bucci | |
| 5,070,849 A | 12/1991 | Rich et al. | |
| 5,080,077 A | 1/1992 | Sawert et al. | |
| 5,289,810 A | 3/1994 | Bauer et al. | |

(Continued)

FOREIGN PATENT DOCUMENTS

CN 2916171 Y 6/2007
DE 198 24 246 A1 12/1998

(Continued)

OTHER PUBLICATIONS

International Search Report and Written Opinion for PCT/US2009/030808, mailed Mar. 11, 2009.

(Continued)

*Primary Examiner* — John Rivell
(74) *Attorney, Agent, or Firm* — Cooley LLP

(57) ABSTRACT

A fluid transfer assembly includes a housing within which at least a portion of a pump element can be disposed. The housing includes a first surface and a second surface and defines a cavity therethrough. The housing is configured to be coupled to a reservoir such that the first surface is disposed within an interior volume of the reservoir and the second surface is disposed outside the interior volume of the reservoir. The housing includes a seal portion configured to fluidically isolate the first surface from the second surface. The cavity is configured to receive at least a portion of the pump element such that movement of the pump element produces a fluid flow from an inlet opening defined by the first surface and an outlet opening defined by the second surface.

11 Claims, 40 Drawing Sheets

(56) References Cited

U.S. PATENT DOCUMENTS

| | | | |
|---|---|---|---|
| 5,341,842 A | 8/1994 | Chih et al. | |
| 5,361,742 A | 11/1994 | Briggs et al. | |
| 5,389,245 A | 2/1995 | Jaeger et al. | |
| 5,415,146 A | 5/1995 | Tuckey | |
| 5,452,701 A | 9/1995 | Tuckey | |
| 5,458,767 A | 10/1995 | Stone | |
| 5,469,829 A | 11/1995 | Kleppner et al. | |
| 5,520,156 A | 5/1996 | Brunnhofer | |
| 5,647,330 A | 7/1997 | Sawert et al. | |
| 5,649,514 A | 7/1997 | Okada et al. | |
| 5,655,504 A | 8/1997 | Iwai | |
| 5,715,798 A | 2/1998 | Bacon et al. | |
| 5,718,208 A | 2/1998 | Brautigan et al. | |
| 5,727,529 A | 3/1998 | Tuckey | |
| 5,743,239 A | 4/1998 | Iwase | |
| 5,769,061 A | 6/1998 | Nagata et al. | |
| 5,791,317 A | 8/1998 | Eck | |
| 5,960,775 A | 10/1999 | Tuckey | |
| 6,102,679 A * | 8/2000 | Brown | 417/550 |
| 6,106,244 A | 8/2000 | Nakatsukasa et al. | |
| 6,113,781 A | 9/2000 | Popoff et al. | |
| 6,123,521 A | 9/2000 | Mori et al. | |
| 6,142,126 A | 11/2000 | Kanamaru | |
| 6,149,399 A | 11/2000 | Bowser et al. | |
| 6,155,793 A | 12/2000 | Tuckey et al. | |
| 6,213,143 B1 | 4/2001 | Schwegler et al. | |
| 6,213,726 B1 | 4/2001 | Tuckey | |
| 6,216,671 B1 | 4/2001 | Sawert et al. | |
| 6,220,454 B1 | 4/2001 | Chilton | |
| 6,241,883 B1 | 6/2001 | Noda | |
| 6,253,735 B1 | 7/2001 | Miyajima | |
| 6,260,543 B1 | 7/2001 | Chih | |
| 6,293,770 B1 | 9/2001 | Matsumoto et al. | |
| 6,311,725 B1 | 11/2001 | Hamada et al. | |
| 6,343,589 B1 | 2/2002 | Talaski et al. | |
| 6,364,630 B1 | 4/2002 | Craft et al. | |
| 6,424,924 B1 | 7/2002 | Wagner et al. | |
| 6,439,205 B2 | 8/2002 | Ushigome | |
| 6,457,458 B1 | 10/2002 | Frank et al. | |
| 6,488,476 B2 | 12/2002 | Eck | |
| 6,491,029 B2 | 12/2002 | Kondou et al. | |
| 6,520,163 B2 | 2/2003 | Yoshioka et al. | |
| 6,679,227 B2 | 1/2004 | Sawert et al. | |
| 6,719,539 B1 | 4/2004 | Yoshioka | |
| 6,729,309 B2 | 5/2004 | Schueler | |
| 6,733,249 B2 | 5/2004 | Maier et al. | |
| 6,773,241 B2 | 8/2004 | Suzuki et al. | |
| 6,786,709 B1 * | 9/2004 | Klahm et al. | 137/565.19 |
| 6,928,989 B2 | 8/2005 | Powell | |
| 6,981,490 B2 | 1/2006 | Nagata et al. | |
| 7,069,912 B2 | 7/2006 | Yoshioka | |
| 7,146,968 B2 | 12/2006 | Koito et al. | |
| 7,237,538 B2 | 7/2007 | Perruchot et al. | |
| 7,246,636 B2 * | 7/2007 | Dudra et al. | 137/565.17 |
| 7,617,814 B2 | 11/2009 | Leppert | |
| 7,677,225 B2 | 3/2010 | Radue et al. | |
| 7,775,235 B2 | 8/2010 | Leppert et al. | |
| 8,079,479 B2 | 12/2011 | Leppert | |
| 8,113,796 B2 | 2/2012 | Marx et al. | |
| 2002/0152996 A1 | 10/2002 | Gabauer et al. | |
| 2003/0000502 A1 | 1/2003 | Jones et al. | |
| 2003/0024509 A1 | 2/2003 | Matusek et al. | |
| 2003/0127075 A1 | 7/2003 | Braun et al. | |
| 2003/0131828 A1 | 7/2003 | Crary | |
| 2004/0000344 A1 | 1/2004 | Okabe et al. | |
| 2004/0037713 A1 | 2/2004 | Schelhas et al. | |
| 2004/0076528 A1 | 4/2004 | Kolb et al. | |
| 2004/0173187 A1 | 9/2004 | Kanamaru et al. | |
| 2005/0178853 A1 | 8/2005 | Doble et al. | |
| 2006/0021603 A1 | 2/2006 | Nagata | |
| 2006/0024176 A1 | 2/2006 | Ikeya | |
| 2006/0070941 A1 | 4/2006 | Cline et al. | |
| 2006/0096582 A1 | 5/2006 | Powell et al. | |
| 2006/0130815 A1 | 6/2006 | Gaffield et al. | |
| 2006/0231079 A1 | 10/2006 | Paluszewski | |
| 2007/0074770 A1 | 4/2007 | Witherspoon et al. | |
| 2007/0113830 A1 | 5/2007 | Koito et al. | |
| 2007/0128049 A1 | 6/2007 | Sanchez et al. | |
| 2008/0295898 A1 | 12/2008 | Leppert et al. | |
| 2009/0184044 A1 | 7/2009 | Leppert | |
| 2009/0223492 A1 | 9/2009 | Leppert | |
| 2010/0047090 A1 | 2/2010 | Marx et al. | |
| 2010/0163327 A1 | 7/2010 | Bernier et al. | |
| 2011/0192381 A1 | 8/2011 | Maruyama et al. | |
| 2011/0194946 A1 | 8/2011 | Bedard et al. | |
| 2011/0200472 A1 | 8/2011 | Leppert et al. | |
| 2011/0217186 A1 | 9/2011 | Yoshizawa et al. | |
| 2012/0080367 A1 | 4/2012 | Leppert | |

FOREIGN PATENT DOCUMENTS

| | | |
|---|---|---|
| DE | 100 28 458 A1 | 12/2001 |
| DE | 103 28 206 A1 | 1/2005 |
| DE | 20 2006 010 856 U1 | 3/2008 |
| EP | 1 508 688 A1 | 2/2005 |
| GB | 2 328 659 A | 3/1999 |
| JP | 2005-256741 A | 9/2005 |

OTHER PUBLICATIONS

European Search Report for Application No. 11153284.2, mailed Aug. 24, 2011.

* cited by examiner

US 9,004,884 B2

IN-TANK FLUID TRANSFER ASSEMBLY

CROSS-REFERENCE TO RELATED APPLICATIONS

This application claims priority to U.S. Provisional Application Ser. No. 61/450,275 entitled "In-tank Oil Pump Assembly," filed Mar. 8, 2011, which is incorporated herein by reference in its entirety.

BACKGROUND

The embodiments described herein relate to fluid transfer components, and more particularly, to a fluid transfer assembly configured to be mounted at least partially within an oil tank.

Some known engines, such as two-stroke engines, utilize an oil delivery system that includes an oil tank that is separate from the fuel tank. Accordingly, such known engines require an oil pump to deliver the oil to the portions of the engine requiring lubrication. Some known oil tanks and oil delivery systems include an in-line oil pump (i.e., an oil pump that is mounted outside of the oil tank). Such systems can be hard to assemble and package within the engine mounting space of the vehicle. Moreover, during operation, such systems can be susceptible to air entrapment within the oil lines that connect the tank and the oil pump and/or the internal components within the oil pump. The oil inlet and/or outlet lines can also result in long priming times in production and in field service. In particular, in some known systems the oil supply lines can be several feet in length (or longer). The length of the oil supply lines can exacerbate this issue.

Thus, a need exists for improved fluid transfer assemblies that can be mounted at least partially within a fluid reservoir.

SUMMARY

Fluid transfer assemblies are described herein. In some embodiments, a fluid transfer assembly includes a housing within which at least a portion of a pump element can be disposed. The housing includes a first surface and a second surface and defines a cavity therethrough. The housing is configured to be coupled to a reservoir such that the first surface is disposed within an interior volume of the reservoir and the second surface is disposed outside the interior volume of the reservoir. The housing includes a seal portion configured to fluidically isolate the first surface from the second surface. The cavity is configured to receive at least a portion of the pump element such that movement of the pump element produces a fluid flow from an inlet opening defined by the first surface and an outlet opening defined by the second surface.

DETAILED DESCRIPTION

Figure 1:
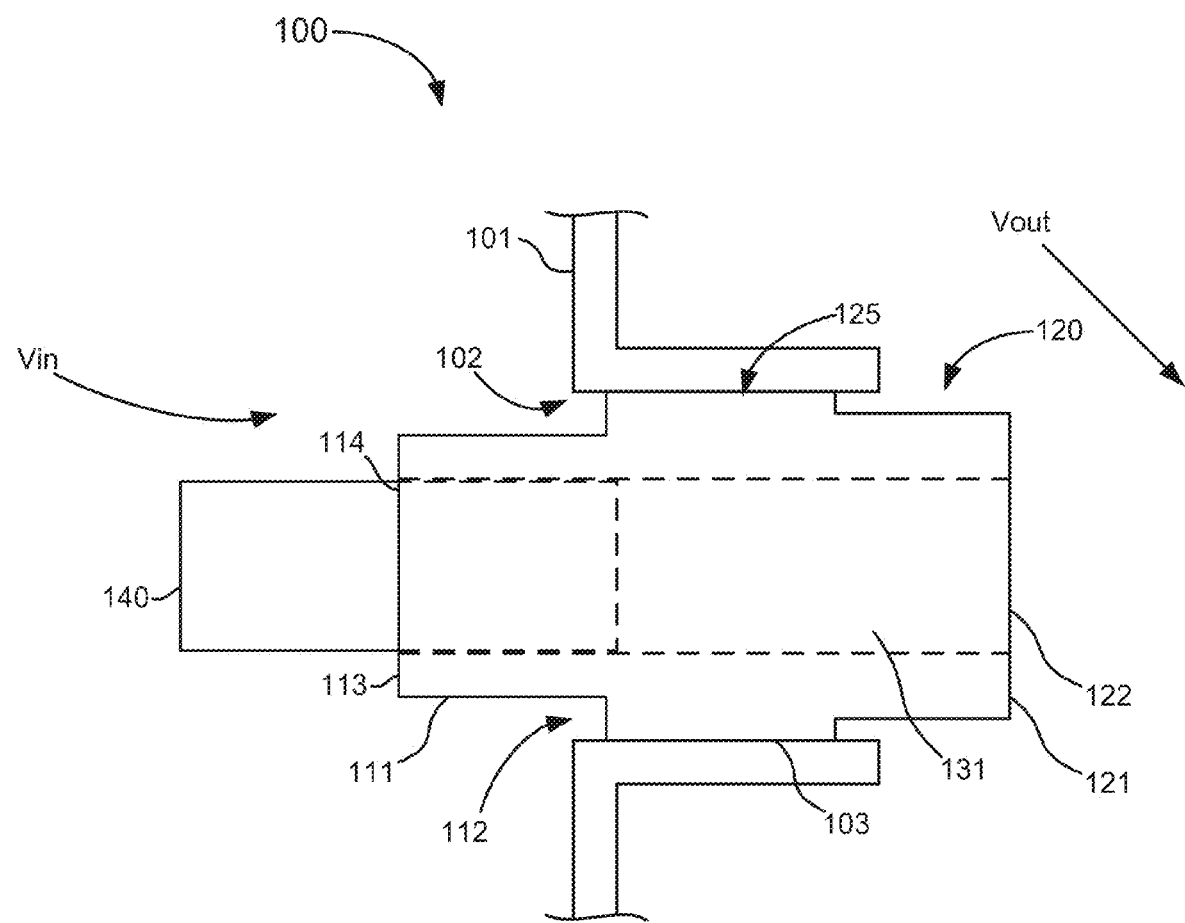
FIGS. 1 and 2 are schematic illustrations of a fluid transfer assembly according to an embodiment, in a first configuration and a second configuration, respectively.

In some embodiments, a fluid transfer assembly includes a housing within which at least a portion of a pump element can be disposed. The housing includes a first surface and a second surface and defines a cavity therethrough. The housing is configured to be coupled to a reservoir, such as for example, an oil tank, fuel tank or the like, such that the first surface is disposed within an interior volume of the reservoir and the second surface is disposed outside the interior volume of the reservoir. The housing includes a seal portion configured to fluidically isolate the first surface from the second surface. The cavity is configured to receive at least a portion of the pump element such that movement of the pump element produces a fluid flow from an inlet opening defined by the first surface and an outlet opening defined by the second surface.

In some embodiments, a method includes disposing at least a portion of a pump element into a cavity defined by a housing. The cavity is configured to extend from an inlet opening defined by a first surface of the housing and an outlet opening defined by a second surface of the housing. The method further includes disposing a filter against the first surface of the housing and coupling an actuator to the housing such that the filter is disposed between the actuator and the first surface. The actuator can be, for example, a solenoid actuator configured to move the pump element within the cavity.

In some embodiments, a fluid transfer assembly includes a housing, an electrical system, and a pump element. The housing includes a first surface and a second surface and defines a cavity therethrough. The housing is configured to be coupled to a reservoir such that the first surface is disposed within an interior volume of the reservoir and the second surface is disposed outside the interior volume of the reservoir. The housing includes a seal portion configured to fluidically isolate the first surface from the second surface. The pump element, which can be, for example, a piston pump element, is disposed at least partially within the cavity. In some embodiments, the fluid transfer assembly can include any number of pump elements. The electrical system is configured to be coupled to the housing and includes an actuator configured to move the pump element within the housing. The electrical system can be, for example, a solenoid arranged such that the activation of the solenoid moves the actuator (e.g., an armature assembly) to engage a portion of the pump element. In this manner, the movement of the pump element produces a fluid flow from an inlet opening defined by the first surface and an outlet opening defined by the second surface.

In some embodiments, a fluid transfer assembly includes a housing, an actuator and a filter. The housing is configured to be coupled to a reservoir containing a fluid such that a first portion of the housing is disposed within the reservoir and a second portion of the housing is disposed outside of the reservoir. The housing includes a seal portion configured to fluidically isolate the first portion from the second portion when the housing is coupled to the reservoir. The housing defines a cavity configured to receive at least a portion of a pump element such that movement of the portion of the pump element within the cavity produces a flow of the fluid from an inlet opening defined by the first portion to an outlet opening defined by the second portion. The actuator, which can be, for example, a solenoid actuator, is configured to move the portion of the pump element within the cavity. The filter, which is any suitable filter for removing particles from the fluid, is disposed between the actuator and the inlet surface of the housing when the actuator is coupled to the first portion of the housing.

In some embodiments, a pump assembly includes a housing and a pump element disposed within the housing. The housing is monolithically constructed (e.g., molded, machined from a single piece or the like), and is configured to be coupled to a reservoir such that a first portion of the housing is disposed within the reservoir and a second portion of the housing is disposed outside of the reservoir. In some embodiments, for example, housing can be coupled within an opening defined by the reservoir. The housing includes a seal portion and a pump portion. The seal portion is configured to fluidically isolate the first portion from the second portion when the housing is coupled to the reservoir. The pump portion is configured to receive at least a portion of a pump. More particularly, the pump portion of the housing defines at least a portion of a pumping chamber (e.g., a cylinder, a stator or the like) that, in cooperation with the pump element, can produce a flow of fluid from the reservoir. In this manner, the housing functions both to seal the reservoir and pump fluid from (or into) the reservoir.

Figure 2:
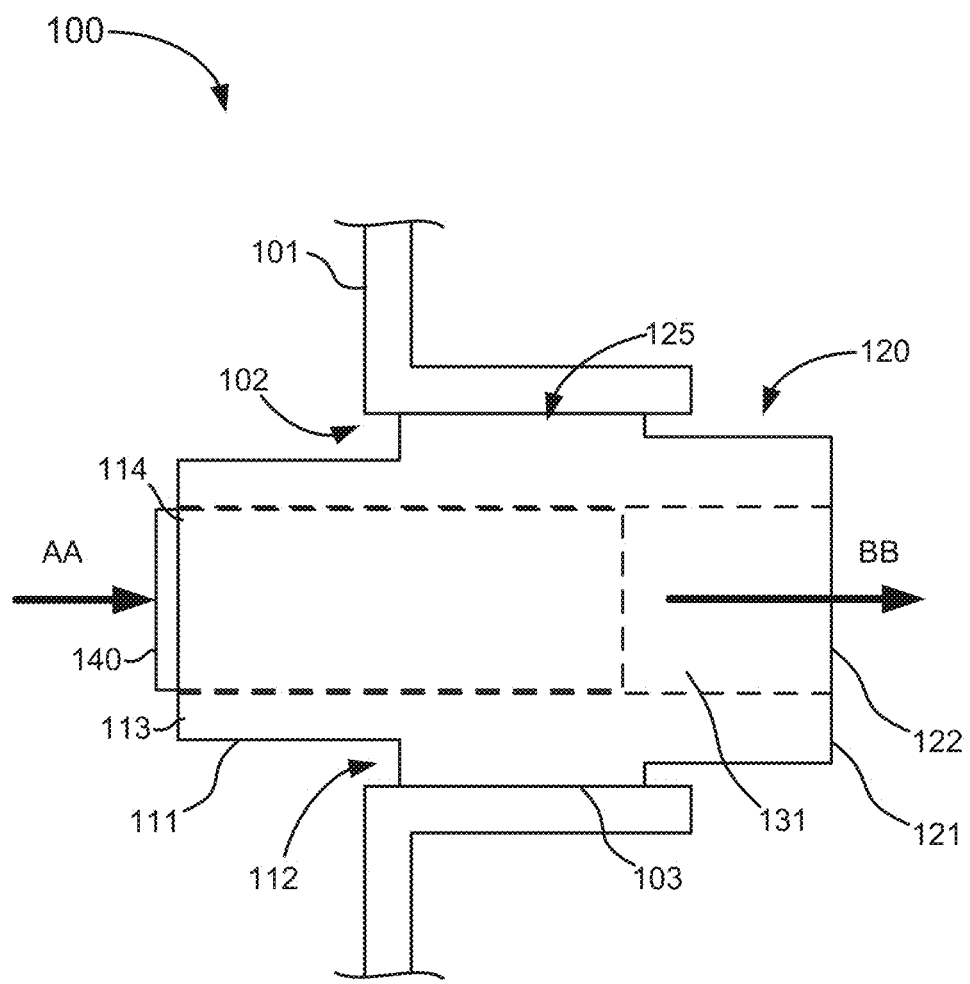

FIGS. 1 and 2 are schematic illustrations of a fluid transfer assembly according to an embodiment in a first and second configuration, respectively. In some embodiments, the fluid transfer assembly can be, for example, an oil pump assembly. As shown in FIG. 1, a fluid transfer assembly 100 includes a housing 111 and a pump element 140. The housing 111 includes a first portion 112, a second portion 120, and a seal portion 125. The housing 111 can be any suitable size, shape, or configuration and can be formed using any suitable material or method. For example, in some embodiments, the housing 111 can be formed from, molded plastic, cast metal, or machined material (e.g., machined billet material such as aluminum). The first portion 112 includes a first surface 113 defining an inlet opening 114. Similarly, the second portion 120 includes a second surface 121 defining an outlet opening 122. Furthermore the housing 111 defines a cavity 131 between the inlet opening 114 and the outlet opening 122.

The housing 111 is configured to be coupled to a reservoir 101 such that the first surface 113 is disposed within an interior volume Vin of the reservoir 101 and the second surface 121 is disposed outside the interior volume Vout of the reservoir 101. Similarly stated, the housing 111 is configured to be coupled to a reservoir 101 such that the first portion 112 is within the reservoir 101 and the second portion 120 is outside of the reservoir 101. Expanding further, the seal portion 125 of the housing 111 is disposed within a recess and/or opening 102 defined by the reservoir 101.

The seal portion 125 can have any suitable structure or configuration to fluidically isolate the interior volume of the reservoir 101 from the exterior volume of the reservoir 101. In some embodiments, the seal portion 125 can include at least one seal member, such as, for example, an o-ring (not shown in FIGS. 1 and 2). In other embodiments, the seal portion 125 can include a sealing membrane, a threaded fitting, a grommet, and/or the like. Furthermore, the seal portion 125 can include a coupling member and/or retention member (e.g., a snap ring, clip, threaded nut, and/or the like (not shown)). For example, in some embodiments, the seal portion 125 can include a snap ring configured to maintain at least the seal portion 125 in contact with a portion of the reservoir 101. In this manner, the seal portion 125 (e.g., at least a seal member included in the seal portion 125) is configured to engage a wall 103 of the reservoir that defines the recess 102 within which the housing 111 is disposed to define a fluid tight seal. Similarly stated, the seal portion 125 can engage the wall 103 of the reservoir 101 such that the inner volume of the reservoir 101 is fluidically isolated from the volume Vout outside the reservoir 101. Said yet another way, the seal portion 125 can engage the walls 103 of the reservoir 101 such that the first surface 113 included in the first portion 112 is fluidically isolated from the second surface 121 included in the second portion 120.

The cavity 131 defined by the housing 111 is configured to receive at least a portion of the pump element 140. In some embodiments, the pump element 140 can be a piston pump. Although shown as receiving a single pump element 140, in other embodiments, the housing can define any number of cavities configured to receive any number of pump elements 140. In other embodiments, the pump element 140 can be a portion of a vane pump, a progressive cavity pump, a gear pump, a gerotor pump, or the like. The pump element 140 is configured to move within the cavity 131 defined by the housing 111 between a first position (FIG. 1) and a second position, as shown by the arrow AA in FIG. 2. In this manner, the pump element 140 and the side wall of the housing 111 defining the cavity 131 collectively form a pump configured to transfer fluid from the reservoir 101. Similarly stated, the housing 111 defines at least a portion of a pumping chamber that, in cooperation with the pump element 140, can produce a flow of fluid from the reservoir 101. Although shown as producing a fluid flow out of the reservoir 101 (as shown by the arrow AA) in other embodiments, movement of the pump element 140 relative to and/or within the housing 111 can produce a flow in any suitable direction (e.g., into or out of the reservoir 101). Moreover, although the pump element 140 is shown as moving linearly within the cavity 131 to produce the flow, in other embodiments the pump element 140 can move in any suitable manner within the cavity 131 (e.g., rotation) to produce the flow.

In some embodiments, the pump element 140 can be engaged by an actuator mechanism such as a solenoid, a motor, or the like (not shown in FIGS. 1 and 2). For example, in some embodiments, a fluid transfer assembly can include a solenoid assembly including an actuator rod. In use, a current can be delivered to the solenoid (e.g., from an external electronic control module, not shown in FIGS. 1 and 2) to move the actuator rod, thereby moving the piston element 140, as shown by the arrow AA. In this manner, a fluid (e.g., disposed within the reservoir 101) can enter the inlet opening 114 and the movement of the pump element 140 can deliver the fluid through the cavity 131 to the outlet opening 122 defined by the second surface 121. For example, in some embodiments, the reservoir 101 can be an oil tank including a volume of oil therein. In such embodiments, the fluid transfer assembly 100 can be an oil pump configured to deliver a portion of the volume of oil disposed within the oil tank to a volume outside the oil tank (e.g., an engine of a recreational vehicle, marine vehicle, and/or any suitable application).

Figure 3:
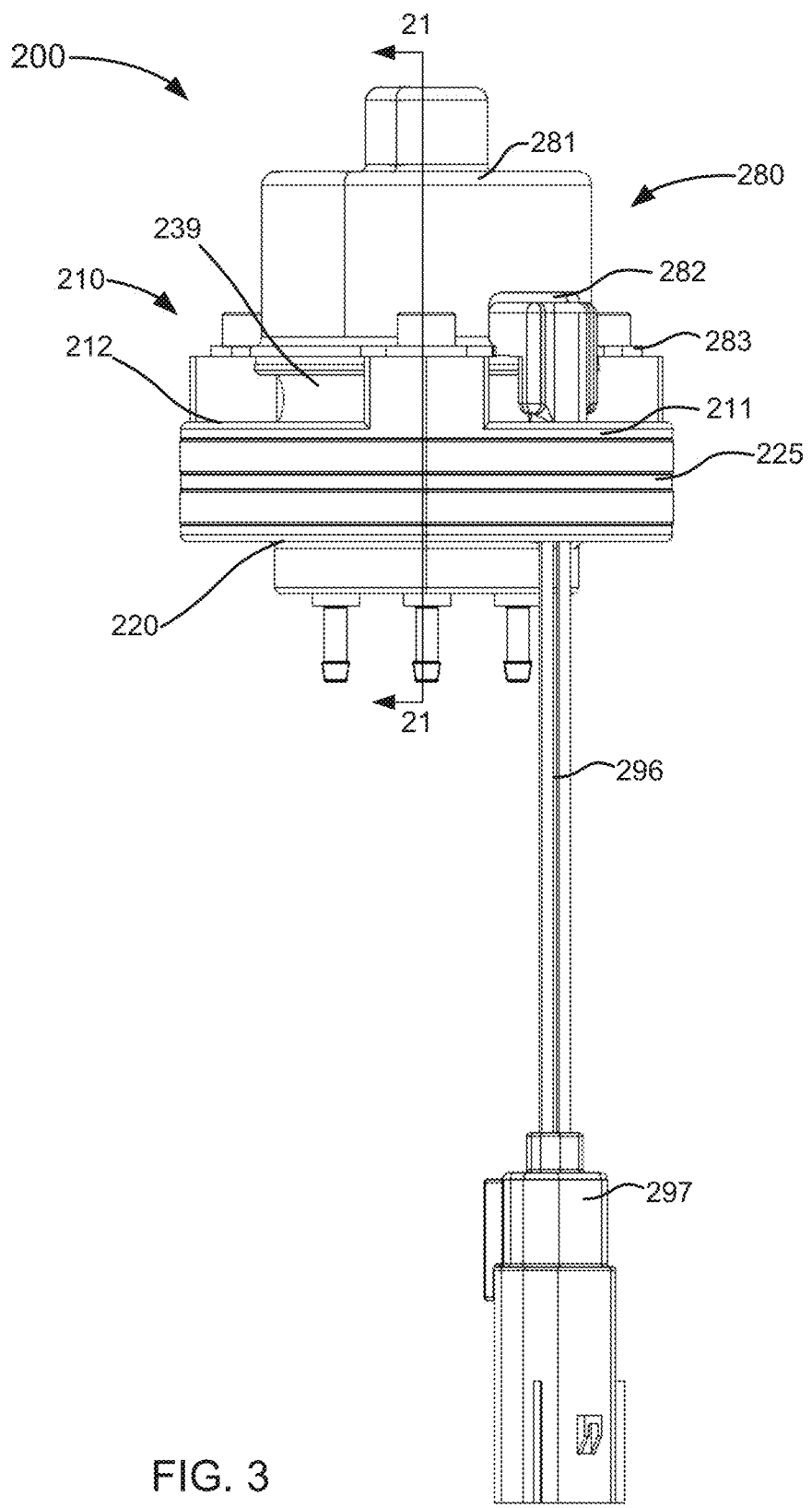
FIG. 3 is a front view of a fluid transfer assembly, according to an embodiment.
Figure 4:
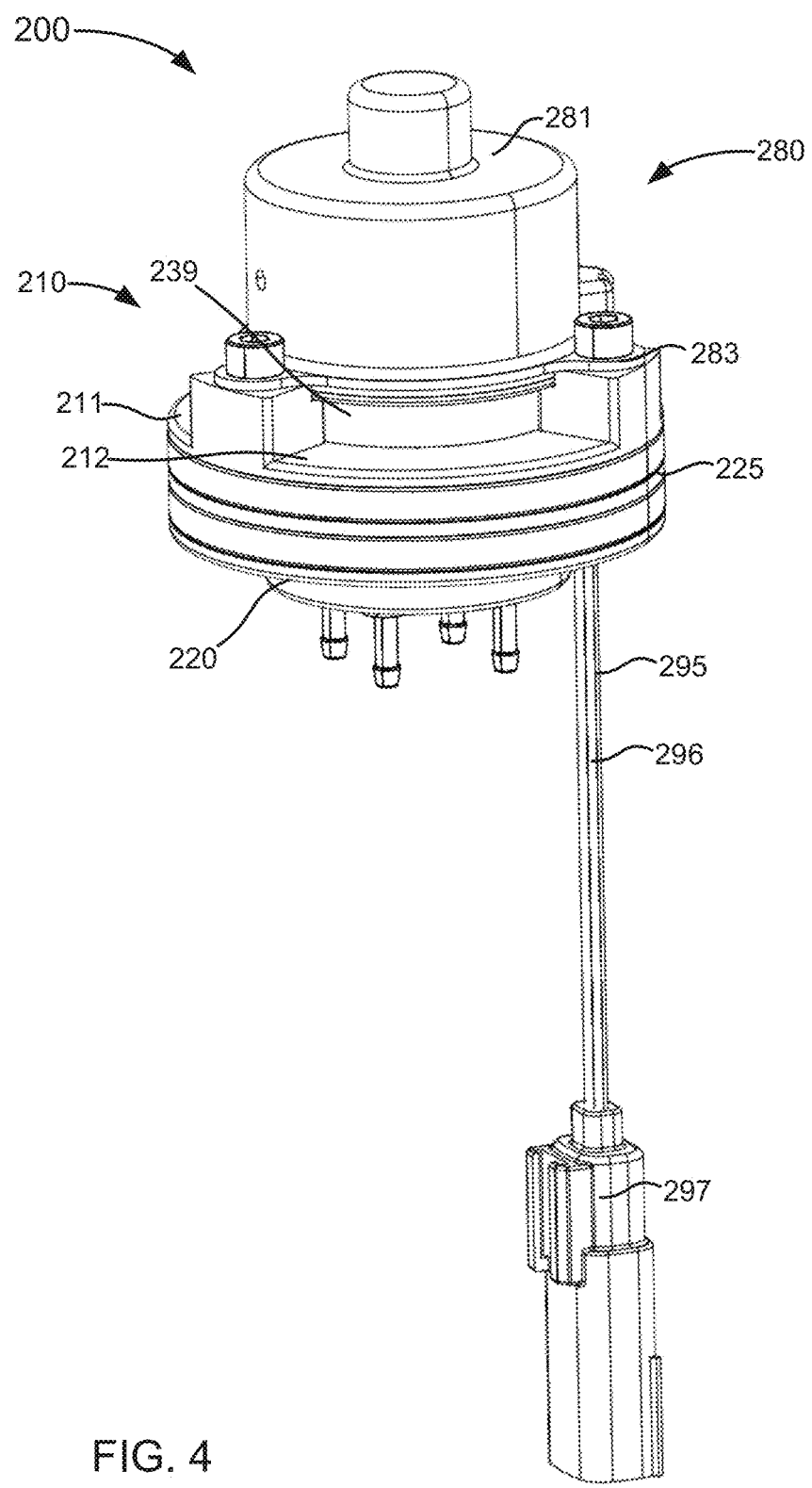
FIG. 4 is a perspective view of the fluid transfer assembly illustrated in FIG. 3.
Figure 5:
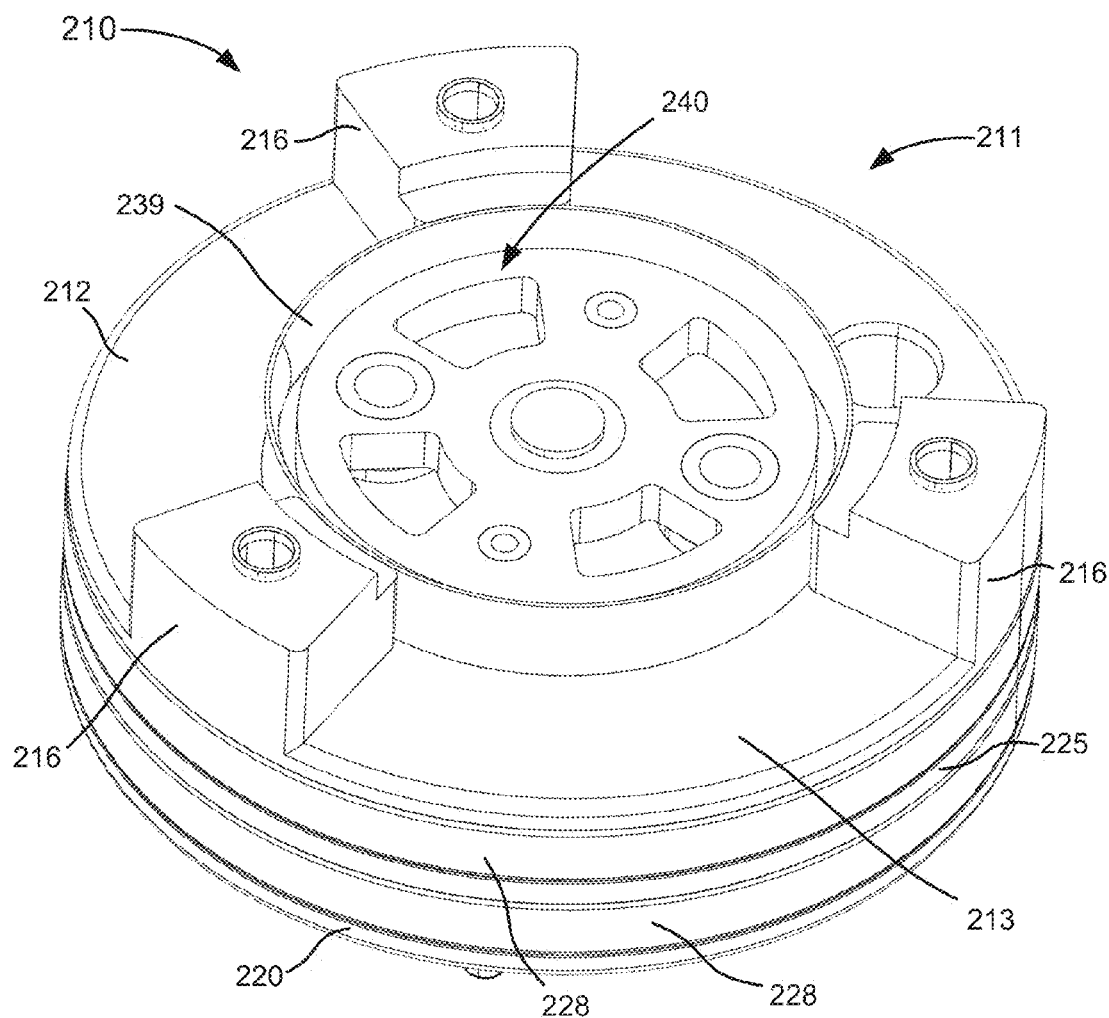
FIG. 5 is a perspective view of a pump subassembly included in the fluid transfer assembly illustrated in FIG. 3.
Figure 6:
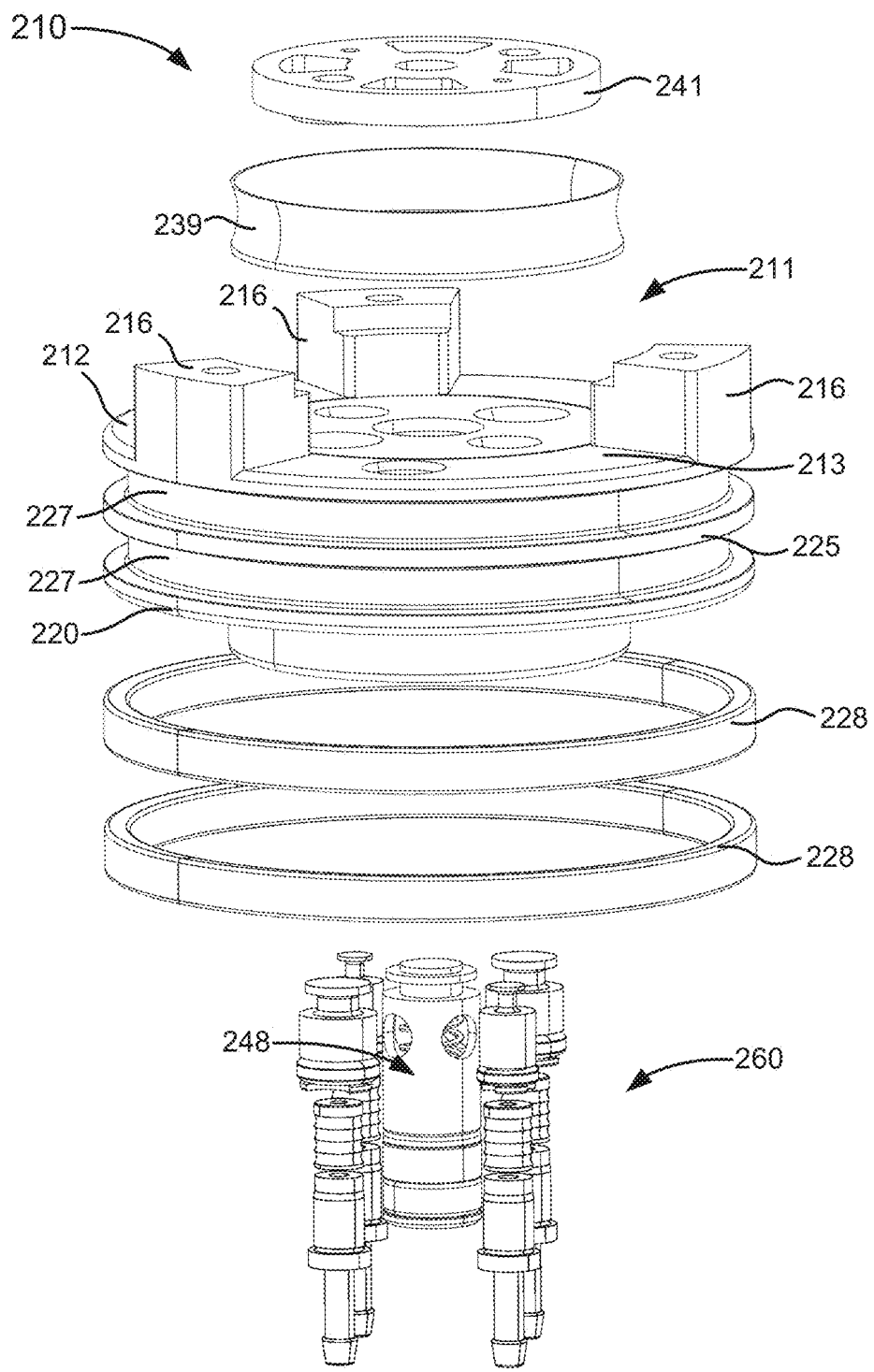
FIG. 6 is an exploded view of the pump subassembly illustrated in FIG. 5.

FIGS. 3-24 illustrate a fluid transfer assembly 200, according to an embodiment. As shown in FIGS. 3 and 4, a fluid transfer assembly 200 includes a pump subassembly 210, a filter 239, and an electrical system 280. The fluid transfer assembly 200 is configured to be coupled to a fluid reservoir 201 (see e.g., FIGS. 21 and 23). More specifically, in some embodiments, the fluid transfer assembly 200 can be coupled to the fluid reservoir 201 such that a first portion (e.g., an inlet portion) of the fluid transfer assembly 200 is disposed within a volume defined by the fluid reservoir 201 and a second portion (e.g., an outlet portion) of the fluid transfer assembly 200 is disposed outside the volume defined by the fluid reservoir 201.

The fluid transfer assembly 200 can be any suitable shape, size, or configuration. For example, while shown in FIGS. 3 and 4 as defining a substantially circular cross-section, in other embodiments the cross-section of a fluid transfer assembly could be square, rectangular, oblong, or any other suitable shape. Furthermore, the fluid transfer assembly 200 can include components formed from any suitable material or any suitable combination of materials. For example, in some embodiments, portions of the fluid transfer assembly can be formed from molded plastic, rubber, cast metal, or machined material (e.g., machined billet material, such as aluminum).

Figure 7:
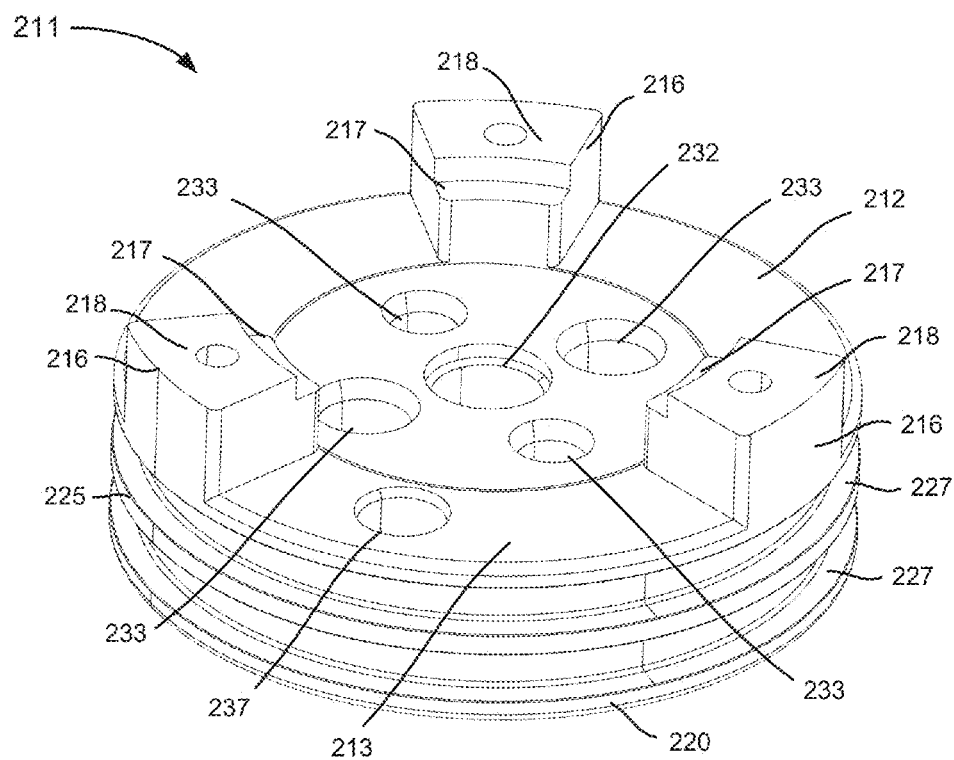
FIG. 7 is a perspective view of a housing included in the pump subassembly illustrated in FIG. 5.

Referring to FIGS. 5-17, the pump subassembly 210 includes a housing 211 and a pump element 240. More specifically, the pump subassembly 210 is configured such that at least a portion of the pump element 240 is disposed within the housing 211 (see e.g., FIGS. 5 and 6). In this manner, the housing 211 and the pump element 240 cooperatively form a pumping mechanism that, when the pump element is actuated, produces a flow of fluid. The housing 211 includes a first portion 212, a second portion 220, and a seal portion 225. Furthermore, the housing 211 defines a bias element bore 232, an electrical bore 237, and four piston bores 233. Although the housing 211 as shown in FIG. 7 defines four piston bores 233, in other embodiments, the housing 211 can define more or less than four piston bores 233. The bias element bore 232 and the piston bores 233 are configured to extend through a first surface 213 included in the first portion 212 and a second surface 221 included in the second portion 220.

Figure 8:
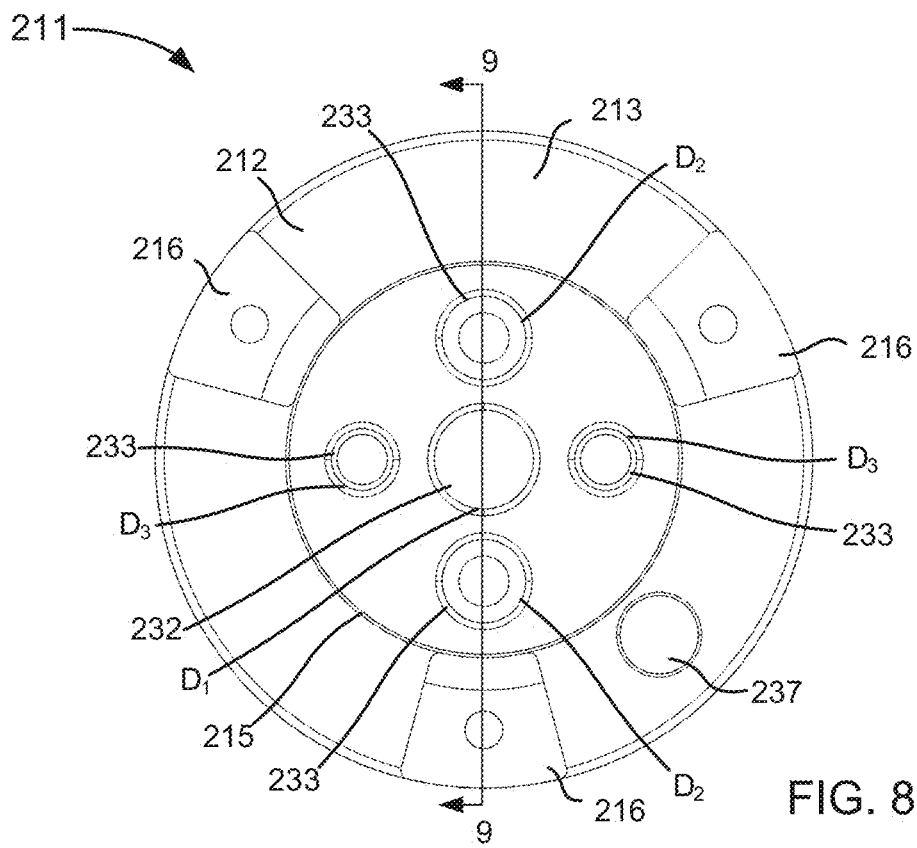
FIG. 8 is a top view of the housing illustrated in FIG. 7.

The bias element bore 232 and the piston bores 233 can be any suitable size or configuration. For example as shown in FIG. 8, the bias element bore 232 can be substantially cylindrical and can have a first diameter $D_1$. As described herein, the bias element bore 232 receives a bias element 248 (see e.g., FIG. 10) of the pump element 240 when the pump subassembly 210 is assembled.

Each of the piston bores 233 is configured to receive a corresponding piston assembly 260 (see FIG. 10) to define a pump and/or fluid machine, as described herein. Accordingly, each of the piston bores 233 can have any suitable diameter to provide the desired clearance and/or operation when the corresponding piston assembly 260 is disposed therein. Moreover, the volume of fluid pumped for each stroke of the piston assembly 260 is proportional to the square of the diameter of the piston assembly 260 and/or the piston bore 233. Accordingly, the size of each of the piston bores 233 can be selected to produce a desired flow rate of fluid when the pump subassembly 210 is actuated.

Figure 9:
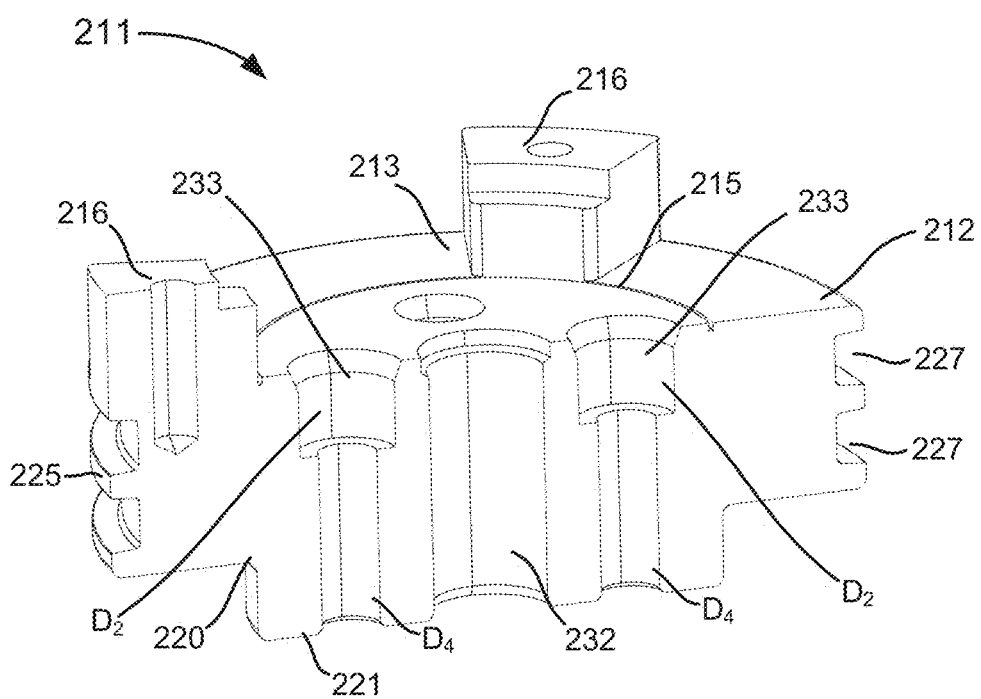
FIG. 9 is a perspective, cross-sectional view of the housing of FIG. 8 taken along the line 9-9.
Figure 10:
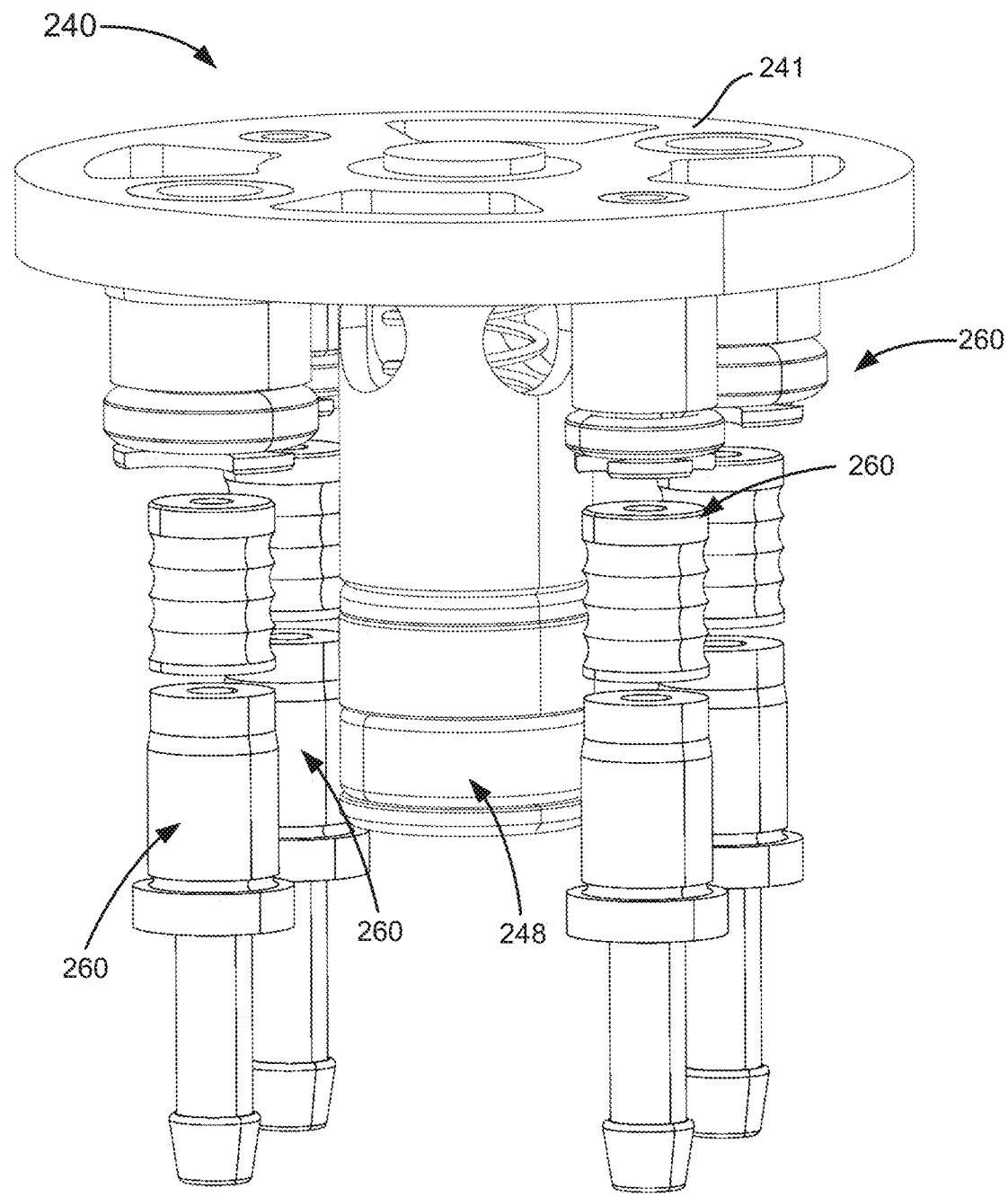
FIG. 10 is a perspective view of a pump element included in the pump subassembly illustrated in FIG. 5.

In some embodiments the piston bores can each have the same diameter (i.e., each pumping chamber produces substantially the same flow rate as the other pumping chambers). In other embodiments, a piston bore can have a different size and/or diameter than other piston bores defined by the housing 211. As shown in FIG. 8, the housing 211 defines a first set of piston bores 233 having a first diameter $D_2$ and a second set of piston bores 233 having a second diameter $D_3$. In this manner, the piston bores 233 can be alternately arranged such that the diameter of a first piston bore 233 is different than the adjacent piston bores 233. In other embodiments, each piston bore 233 can have a unique diameter. Similarly stated, in some embodiments, each piston bore 233 has a diameter that is different from the diameter of the other piston bores 233. In addition, in some embodiments, each piston bore 233 can define a first diameter and a second diameter. For example as shown in FIG. 9, the piston bores 233 can define the first diameter $D_2$ and a second diameter $D_4$. In this manner, the piston bores 233 can be configured to engage multiple portions of the pump element 240, as described in further detail herein.

The first surface 213 of the housing 211 includes a set of mounting protrusions 216, and further defines a filter groove 215. The mounting protrusions 216 include a mounting surface 218 that defines a notch 217 (see e.g., FIG. 7). The mounting surface 218 and the notch 217 are configured to receive a portion of the electrical system 280. The electrical bore 237 receives a portion of the electrical system 280, as described in further detail herein.

The seal portion 225 of the housing 211 can be any suitable configuration and is disposed between the first surface 213 of the first portion 212 and the second surface 221 of the second portion 220. Similarly stated, the seal portion 225 is disposed between the portion of the housing 211 disposed within the reservoir (e.g., the first portion 212) and the portion of the housing 211 disposed outside of and/or accessible from a volume outside of the reservoir (e.g., the second portion 220). In this manner, the seal portion 225 engages a portion of the fluid reservoir 201 (e.g., FIGS. 21 and 23) to form a fluid tight seal when the pump subassembly 210 is coupled to the reservoir 201. The seal portion 225 defines a set of grooves 227 configured to receive a set of seal member 228 therein. The seal members 228 can be any suitable seal member. For example, referring back to FIG. 6, the seal portion 225 can include two annular seal members 228 configured to be disposed within the two grooves 227 defined by the seal portion 225. In some embodiments, the seal members 228 can be o-rings formed from any suitable material such as, for example, rubber.

While shown in FIGS. 3-24 as including annular seal members 228, in other embodiments, the seal portion 225 can include a sealing structure, a threaded fitting, a grommet, and/or the like. Furthermore, the seal portion 225 can include a coupling member and/or retention member (not shown). For example, in some embodiments, the seal portion 225 can include a snap ring configured to maintain at least the seal portion 225 in contact with a portion of the reservoir 201. In other embodiments, the seal portion 225 can include a clip, a threaded nut, and/or any other suitable retention member. In this manner, the seal portion 225 (and/or at least the seal member 228 included in the seal portion 225) is configured to engage a wall of the reservoir 201 to define a fluid tight seal. Similarly stated, the seal portion 225 can engage the wall of the reservoir 201 such that an inner volume of the reservoir 201 is fluidically isolated from a volume outside the reservoir 201. Said yet another way, the seal portion 225 can engage the walls of the reservoir 201 such that the first surface 213 included in the first portion 212 is fluidically isolated from the second surface 221 included in the second portion 220.

Referring now to FIGS. 10-17, the pump element 240 includes an actuator plate 241, a bias element 248 and a set of piston elements 260. The actuator plate 241 can be any suitable configuration and is coupled to the bias element 248 and at least a portion of the piston elements 260 (i.e., the pumping member 261). While shown as including four piston elements 260, in some embodiments the pump element 240 can include and number of the piston elements 260. Furthermore, the number of piston elements 260 included in the pump element 240 is configured to correspond to the number of piston bores 233 defined by the housing 211.

Figure 11:
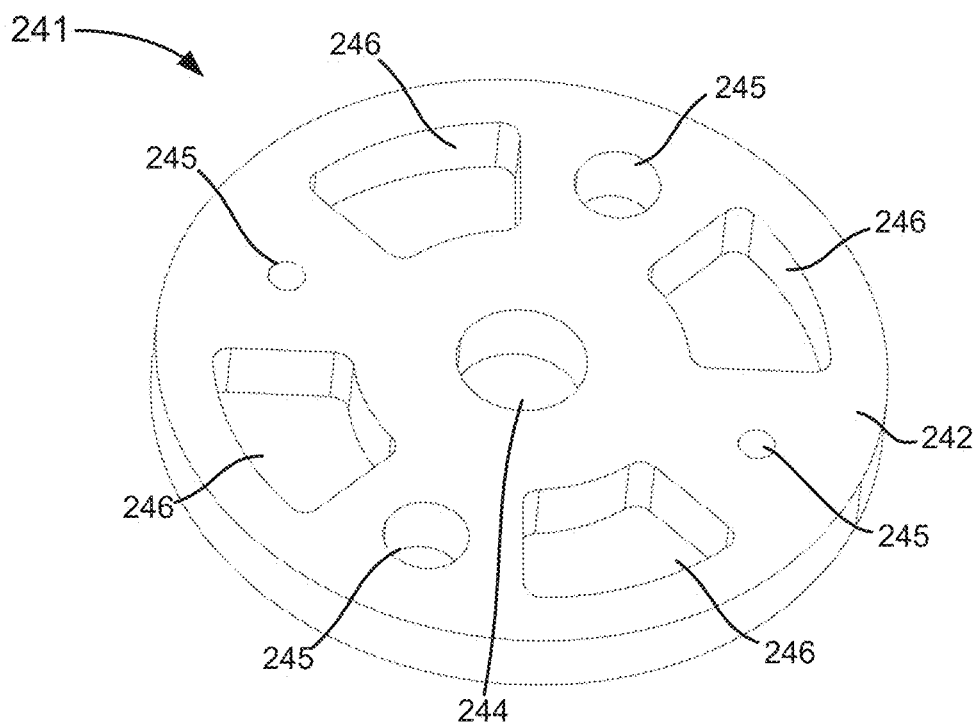
FIG. 11 is a perspective view of an actuator plate included in the pump element illustrated in FIG. 10.
Figure 12:
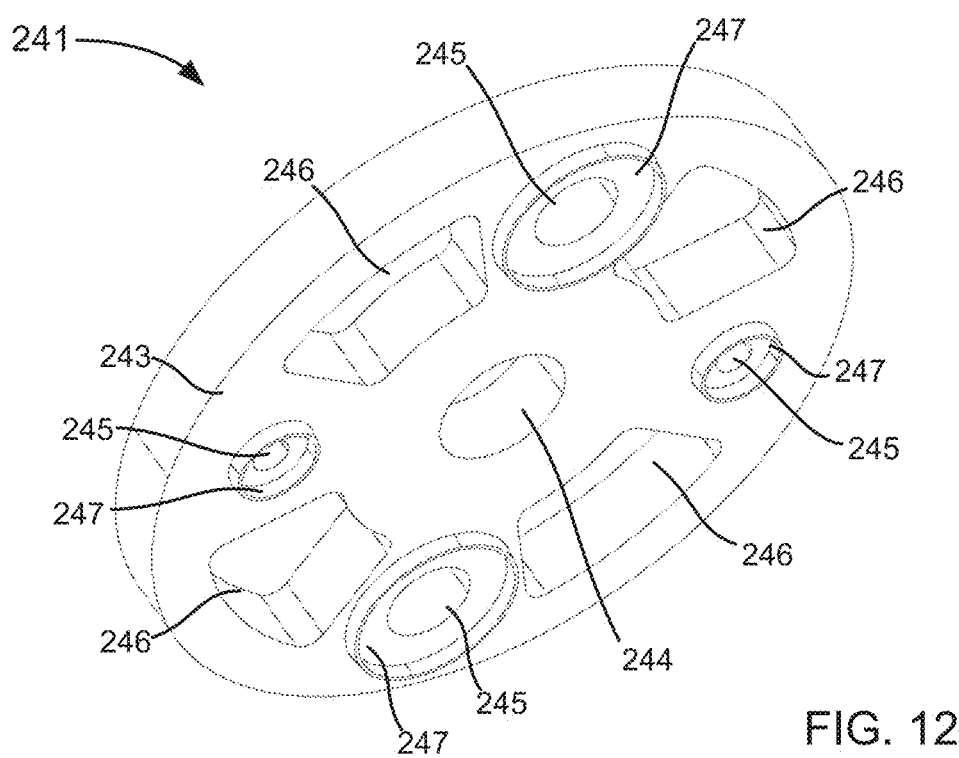
FIG. 12 is a bottom perspective view of the actuator plate illustrated in FIG. 11.

As shown in FIGS. 11 and 12, the actuator plate 241 includes a first surface 242 and a second surface 243 and defines a bias element opening 244, a set of piston element openings 245, and a set of fluid openings 246. The second surface 243 includes a set of piston seats 247 configured to receive a portion of the piston elements 260 (in particular, a fitting 262 of the pumping member 261, see e.g., FIG. 14). Similarly, the bias element opening 244 is configured to receive a portion of the bias element 248, as described in further detail herein. The fluid openings 246 are configured such that a portion of a fluid can flow from a volume defined at least in part by the first surface 242 of the actuator plate 241 to a volume defined at least in part by the second surface 243 of the actuator plate 241.

Figure 13:
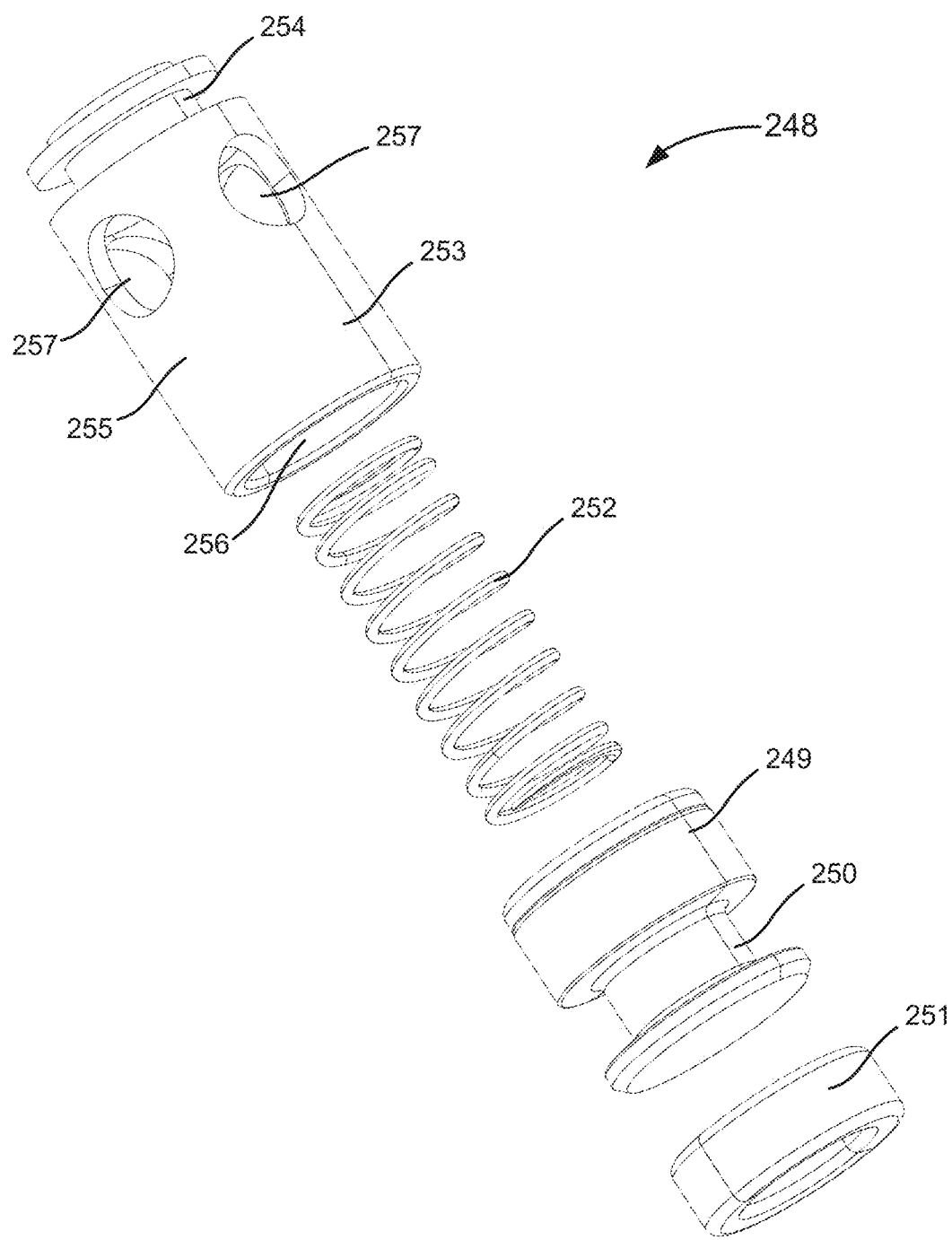
FIG. 13 is an exploded view of a bias mechanism included in the pump element illustrated in FIG. 10.
Figure 21:
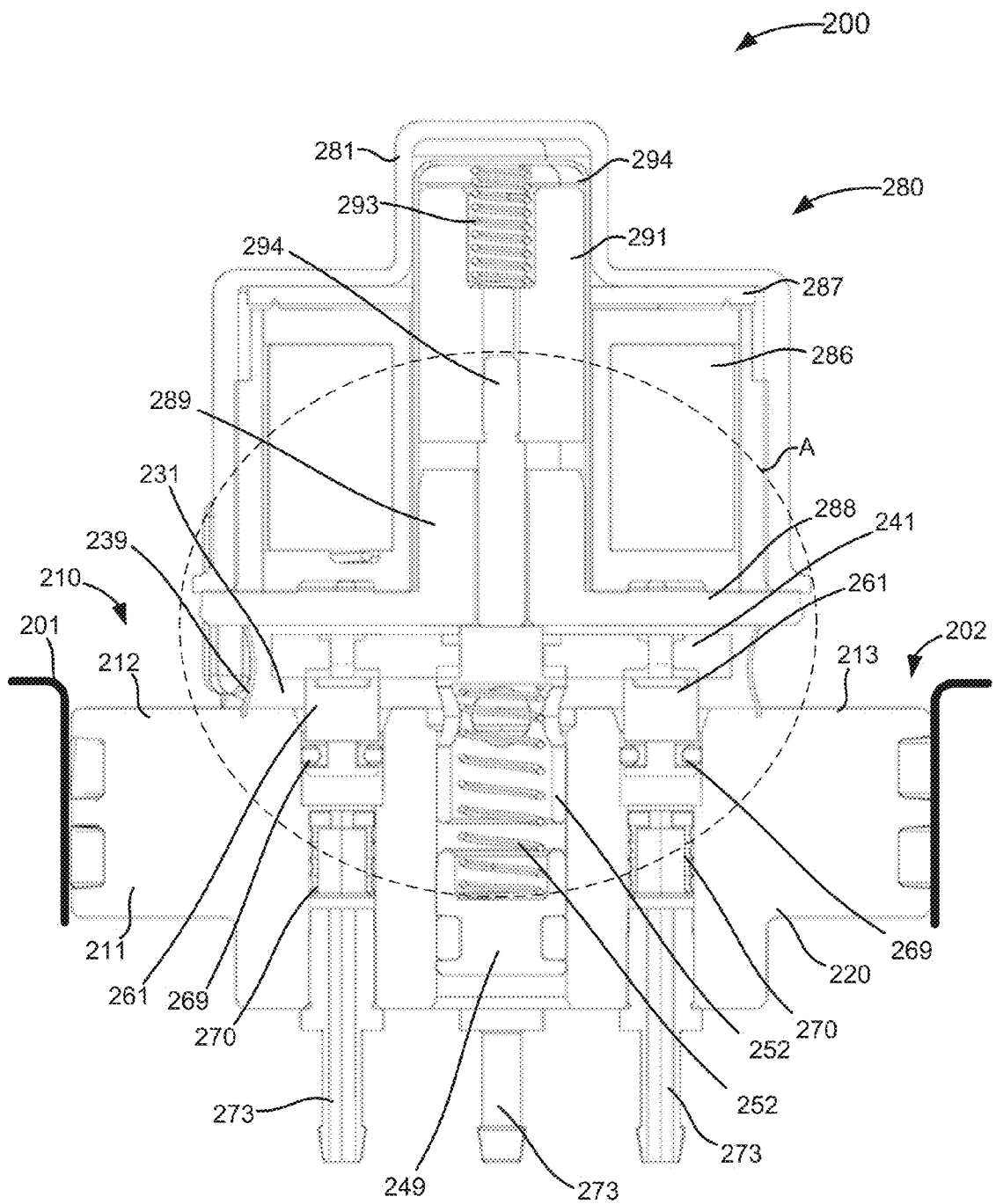
FIG. 21 is a cross-sectional view of the fluid transfer assembly illustrated in FIG. 3 taken along the line 21-21, in a first configuration.

The bias element 248 includes a base 249, a spring 252, and a coupling member 253 and is configured to be disposed within the bias element bore 232 of the housing 211. As shown in FIG. 13, the base 249 defines a channel 250 configured to receive a seal member 251 such as, for example, an o-ring. With the seal member 251 disposed within the channel 250, the seal member 251 can engage a portion of the housing 211 that defines the bias element bore 232 to form a fluid tight seal, as shown in FIG. 21. Furthermore, the base 249 can form a friction fit with the wall defining the bias element bore 232 such that a force substantially greater than a force generated through the operation of the fluid transfer assembly 200 need be applied to overcome the friction fit to remove the base 249 of the bias element 248 from the bias element bore 232. In this manner, the base 249 can be press fit into the bias element bore 232 a desired distance to control the stroke of at least a portion of the pump element 240, as described in further detail herein.

The coupling member 253 includes a fitting 254 and annular walls 255 that extend from a surface of the fitting 254. The annular walls 255 define a void, pocket and/or opening 256 configured to receive a portion of the spring 252. The fitting 254 is configured to be disposed within the bias element opening 244 defined by the actuator plate 241 to be coupled to the actuator plate 241. In some embodiments, the fitting 254 can be retained within the bias element opening via a coupling mechanism (e.g., a snap ring) disposed within the groove defined by the fitting. In other embodiments, the fitting 254 is configured to define a press fit within the bias element opening 244. In this manner, the fitting 254 can include any suitable feature configured to plastically deform, thereby fixedly coupling the coupling member 253 to the actuator plate 241. In other embodiments, the coupling member 254 can define any suitable coupling with the actuator plate 241. For example, in some embodiments, the fitting 254 can be a threaded fitting configured to removably couple the coupling member 254 to the actuator plate 241. In still other embodiments, the coupling member 253 can be monolithically formed with the actuator plate 241 (e.g., molded together, cast together, or machined from the same work piece).

In use, the movement of the pump element 240 relative to and/or within the housing 211 (described in further detail herein) moves the spring 252 from an expanded configuration to a compressed configuration. When the spring 252 is in the compressed configuration, the spring 252 can exert at least a portion of a biasing force (produced by the spring) on the coupling member 253 and thus, a portion of the biasing force on the actuator plate 241. Similarly stated, when the fluid transfer assembly 200 is moved from the first configuration (intake stroke, non-actuated) to the second configuration (pumping stroke, actuated), the spring 252 is configured to exert a force on the coupling member 253, thereby biasing the fluid transfer assembly 200 towards the first configuration such that when the actuation force is released the pump element 240 will return to the first position, as described in further detail herein.

The coupling member 253 defines a set of fluid openings 257 configured to allow a fluid to flow through the openings 257 during operation. Thus, the arrangement of the openings 257 is such that a fluid volume and/or pressure do not substantially build between the base 249 and the coupling member 253.

Figure 14:
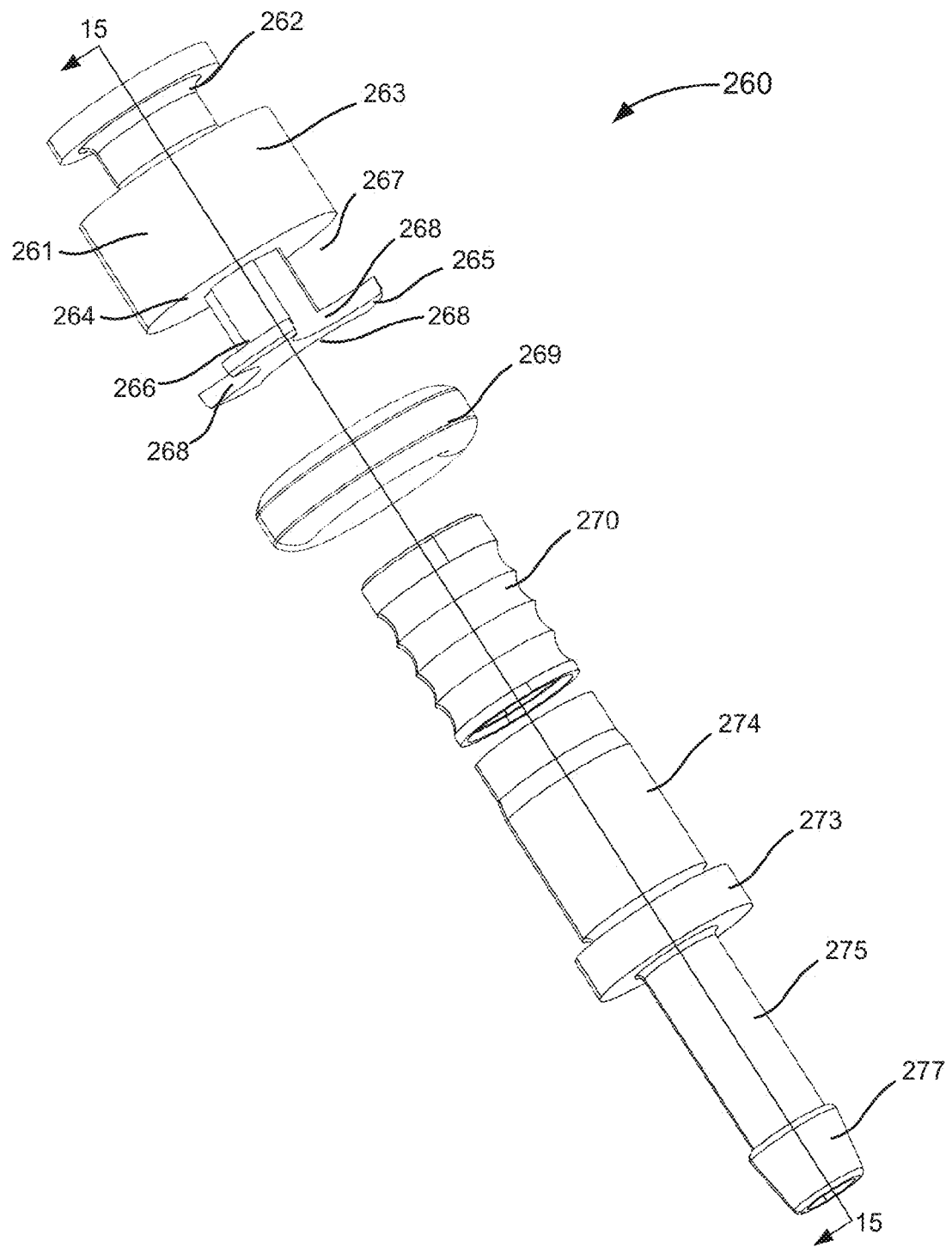
FIG. 14 is an exploded view of a piston assembly included in the pump element illustrated in FIG. 10.
Figure 15:
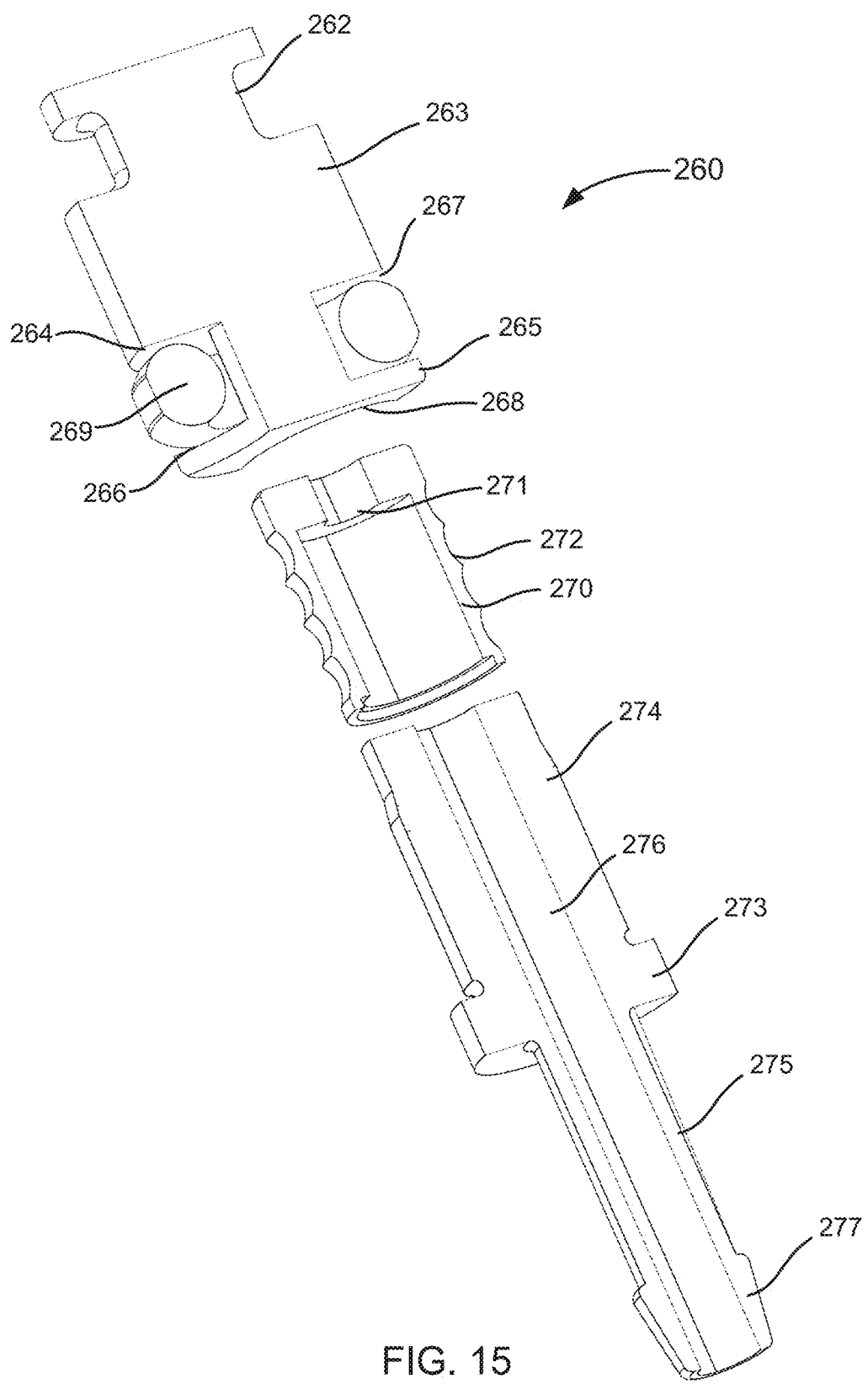
FIG. 15 is a cross-sectional view of the piston assembly of FIG. 14 taken along the line 15-15.

As shown in FIGS. 14-17, the piston assembly 260 includes a pumping member 261 (also referred to as a pumping element), a seal member 269, a valve member 270, and an outlet port 273. The pumping member 261 includes a fitting 262, a body 263, and a base 265. Furthermore, the pumping member 261 defines a channel 267 between a bottom surface 264 of the body 263 and a top surface 266 of the base 265. The channel 267 is configured to receive the seal member 269 such that the seal member 269 is movably disposed within the channel 267 (FIG. 15). In particular, the seal member 269 can move along the longitudinal axis of the pumping member 261 to alternatively engage and/or form a seal with the bottom surface 264 and the top surface 266 when the pumping member 261 is moved within the piston bore 233, as described herein. In addition, the seal member 269 is configured to engage the wall of the housing 211 that defines the piston bore 233, as further described herein. In this manner, the pumping member 261 (or pumping element) and the housing 211 collectively form a pumping chamber such that, when the assembly is actuated, a fluid flow within the piston bore 233 is produced.

The base 265 of the pumping member 261 defines a set of fluid passageways 268. The fluid passageways 268 can be any suitable configuration. For example, as shown in FIG. 14, the base 265 defines a set of arcuate shaped fluid passageways 268. In this manner, the seal member 269 and the pumping member 261 can be moved between a first configuration (in which the seal member 269 is disposed against the bottom surface 264) and a second configuration (in which the seal member 269 is disposed against the top surface 266). In the first configuration a fluid can flow through the fluid passageways 268, but flow through the volume between the body 263 of the valve element 261 and the wall defining the piston bore 233 is prevented (due to the position of the seal member 269). In the second configuration fluid can flow through the volume between the body 263 of the valve element 261 and the wall defining the piston bore 233 because the seal member 269 is disposed apart from the bottom surface 264. Moreover, in the second configuration fluid can also flow through the set of fluid passageways 268, even though the seal member 269 is disposed against the top surface 266.

Figures 16, 17:
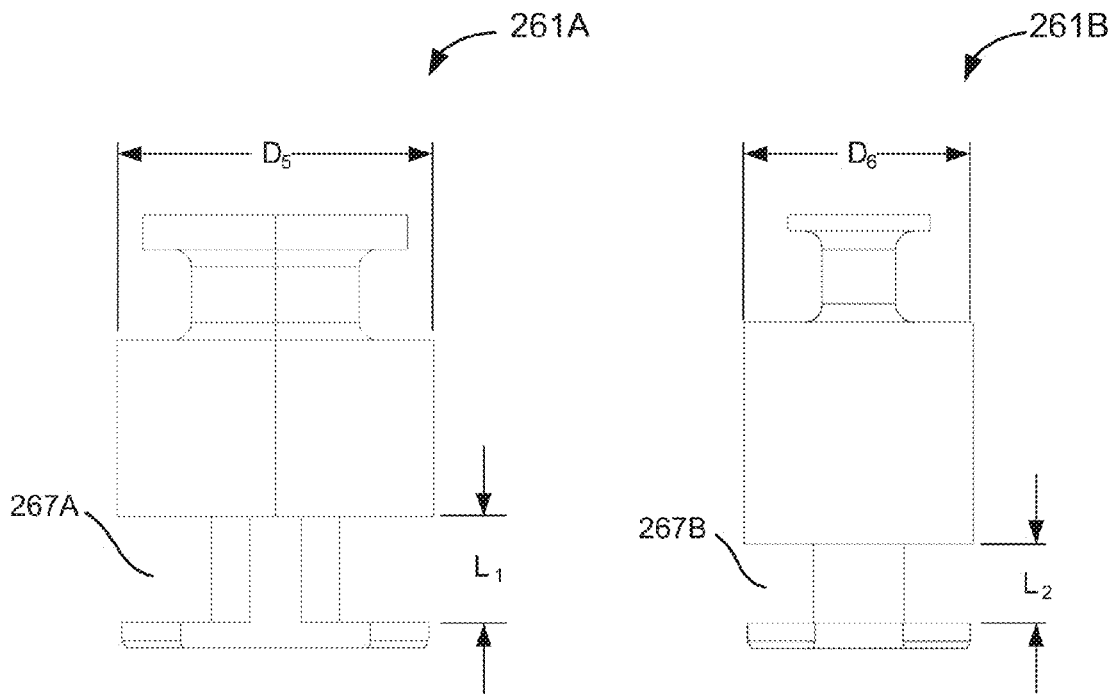
FIGS. 16 and 17 are front views of a first pumping member and a second pumping member, respectively, included in the piston assembly illustrated in FIG. 14.

The pumping member 261 can be any suitable size or configuration. For example, as shown in FIGS. 16 and 17, the pump element 240 can include a first pumping member 261A (FIG. 16) having a first size and a second pumping member 261B (FIG. 17) having a second size. As described above, in some embodiments, the housing 211 includes the first set of piston bores 233 having the first diameter $D_2$ and the second set of piston bores 233 having the second diameter $D_3$. In this manner, the first pumping member 261A can have a diameter $D_5$ such that the first pumping member 261A can be disposed within the first set of piston bores 233 having the diameter $D_2$. Similarly, the second pumping member 261B can have a diameter $D_6$ such that the second pumping member 261B can be disposed within the second set of piston bores 233 having the diameter $D_3$. Similarly stated, the pumping members 261 can be any suitable size such that the pumping members 261 can be disposed within the piston bores 233. Furthermore, the size of the pumping members 261 can correspond to the size of the piston bore 233 in which the pumping member 261 is disposed to produce the desired fit for sealing and/or pumping efficiency.

In addition, the pumping members (or pumping elements) 261 can be configured such that, in use, the size and/or configuration of the pumping members 261 can influence the volume of fluid pumped when the pump subassembly 210 is actuated. Similarly stated, the pumping elements 261 and the housing 211 (specifically the piston bores 233) can be configured to produce a desired flow rate of fluid when actuated. In this manner, the piston bores 233 and the pumping member 261 collectively define a set of independent fluid transfer mechanisms within the housing 211 each of which produces a desired flow rate when actuated. Thus, the flow rate of the fluid (e.g., oil) produced at each outlet port 273 can be controlled and/or set independently from the flow rate produced at the adjacent outlet port without the need for throttling the flow.

For example, a channel 267A of the first pumping member 261A has a first length of $L_1$ and a channel 267B of the second pumping member 261B has a second length $L_2$ shorter than the length $L_1$ of the channel 267A of the first pumping member 261A. In this manner, an effective stroke length and therefore the fluid volume displaced by the first pumping member 261A and the second pumping member 261B can be controlled by increasing or decreasing the length of the channel 267A and 267B, respectively. In particular, the effect stroke length can change based on the movement of the seal member 269 within the channel 267. For example, in some embodiments, the length $L_1$ of the channel 267A defined in the first pumping member 261A can result in a shorter effective stroke length (e.g., the amount of time a fluid can flow past the seal member 269) than the effective stroke length $L_2$ of the channel 267B defined by the second pumping member 261B.

Referring back to FIG. 15, the valve member 270 defines a channel 271 and can be of any suitable configuration and/or can include any suitable mechanism for controlling flow therethrough. For example, while not specifically shown in FIG. 15, the valve member 270 can be a check valve configured to be disposed within a portion of the piston bore 233. Accordingly, the valve member 270 can define any suitable diameter such that an outer surface 272 of the valve member 270 engages the walls defining the portion of the piston bore 233. Furthermore, the valve member 270 is configured to receive a portion of a fluid flow through the channel 271 when the valve member 270 is in the open position and to block the fluid flow through the channel 271 when the valve member 270 is in the closed position, as described in further detail herein.

The outlet port 273 includes a first portion 274 and a second portion 275 and defines a channel 276 therethrough. The outlet port 273 can be any suitable shape, size, or configuration. For example, the first portion 274 is configured to be disposed within a portion of the piston bore 233. Accordingly, the first portion 274 can be substantially cylindrical and have a diameter such that the first portion 274 forms a fluid tight seal with the walls defining the piston bore 233. The second portion 275 of the outlet port 273 extends from the first portion 274 and includes a barbed fitting 277 configured to receive a fluid line (e.g., an external fluid line such as an oil line). In use, the outlet port 273 receives a fluid flow through the channel 276 and is configured to deliver the fluid flow to a volume outside the outlet port 273, as described in further detail herein. While shown in FIGS. 3-24 as being included in the piston assembly 260, in some embodiments, the outlet port 273 can be included in and/or defined by the housing 211. For example, in some embodiments, the outlet port 273 can be monolithically formed with the second portion 220 of the housing 211.

Figure 18:
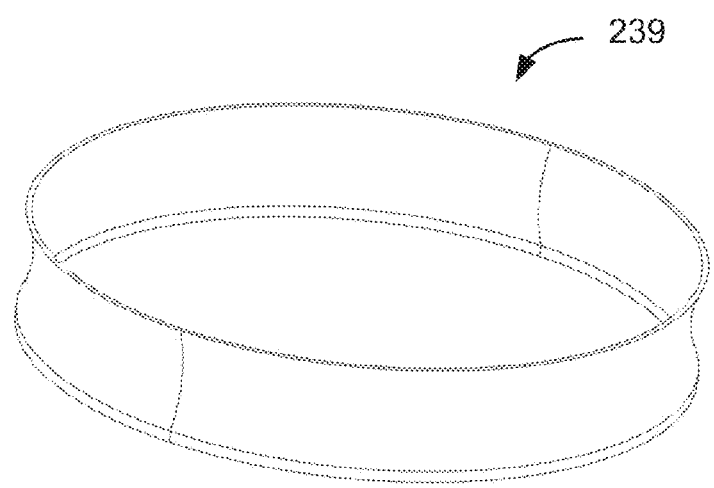
FIG. 18 is a perspective view of a filter element included in the fluid transfer assembly illustrated in FIG. 3.

Referring now to FIG. 18, the filter 239 is annular filter configured to be disposed between the first surface 213 of the housing 211 and a portion of the electrical system 280. More specifically, a portion of the filter 239 is disposed within the filter groove 215 defined by the first surface 213. In this manner, the first surface 213 can retain the filter 239 and/or limit movement of the filter 239 when the electrical system 280 is coupled to the housing 211, as described below. The filter 239 can be any suitable filter. For example, in some embodiments, the filter 239 can be formed from cotton, paper, fiberglass, or the like.

Figure 19:
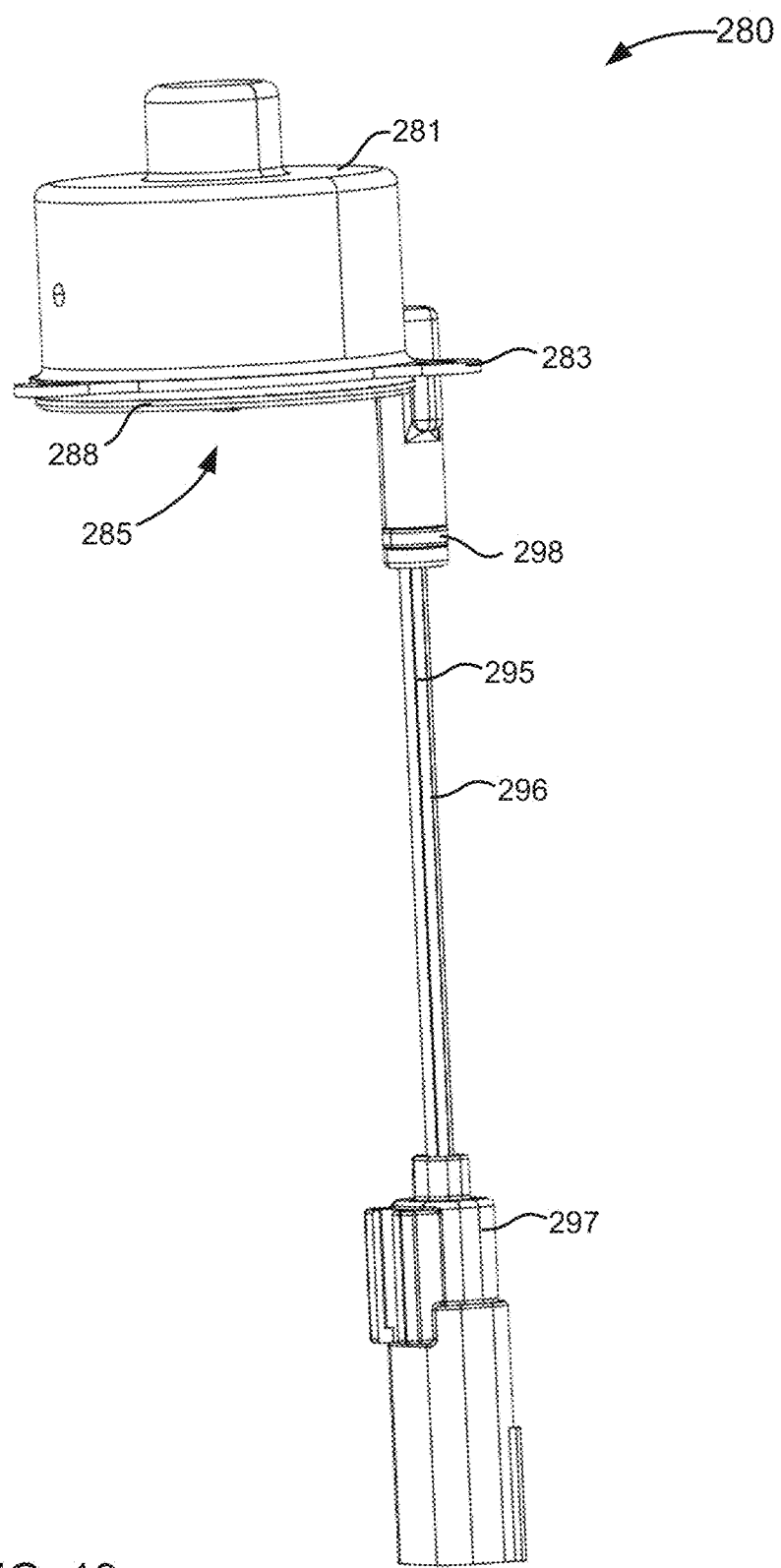
FIG. 19 is a perspective view of an electrical system included in the fluid transfer assembly illustrated in FIG. 3.
Figure 20:
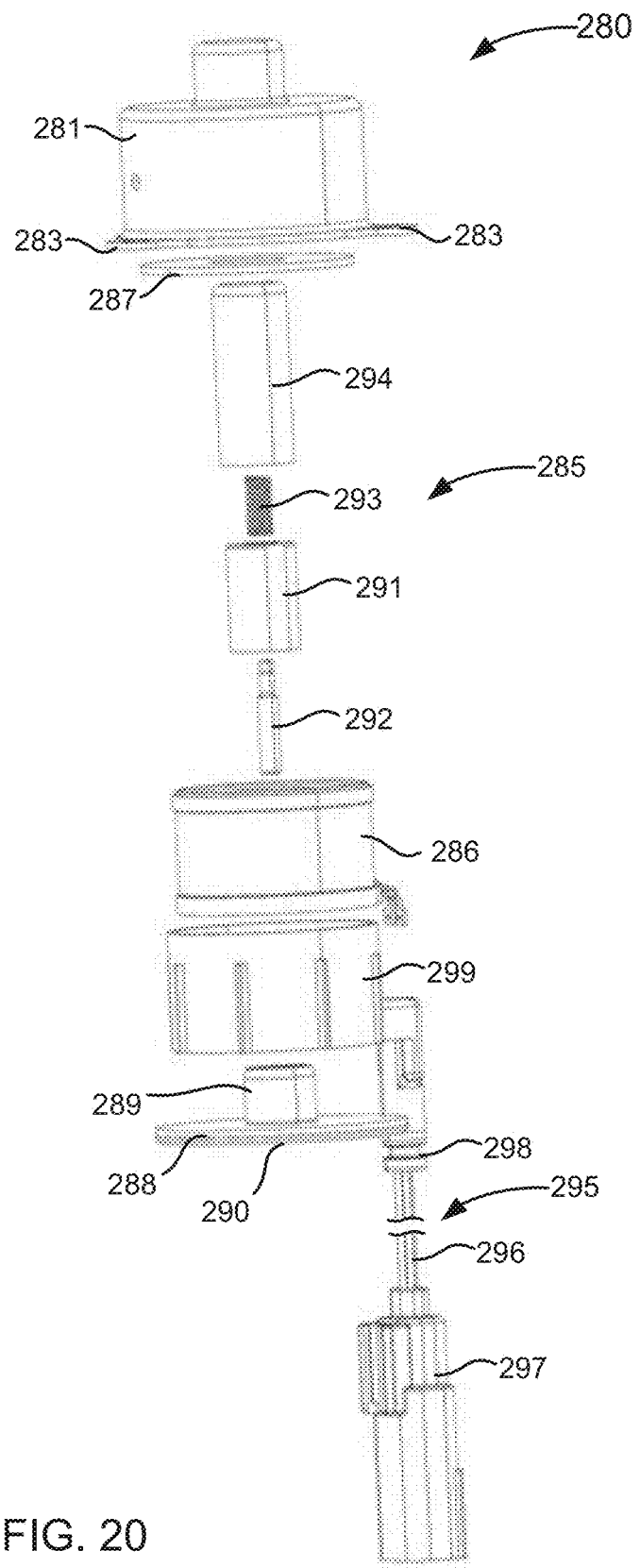
FIG. 20 is an exploded view of the electrical system illustrated in FIG. 19.

As shown in FIGS. 19 and 20, the electrical system 280 includes a cover 281, a solenoid assembly 285, and a wire assembly 295. The cover 281 is configured to substantially enclose at least a portion of the solenoid assembly 285 and the wire assembly 295 and includes a mounting portion 283. The mounting portion 283 of the cover 281 is configured to be coupled to the mounting surface 218 of the mounting portion 216 included in the housing 211 (see e.g., FIG. 4).

The wire assembly 295 includes a wire 296, a connector 297, a seal member 298, and a solenoid casing 299. The wire 296 is coupled to a portion of the solenoid assembly 285 at a first end and the connector 297 at a second end. The connector 297 is configured to be coupled to an external electrical source such as, for example, a control module of a vehicle. A portion of the solenoid casing 299 is configured to extend through a notch 282 defined by the cover 281 and be passed at least partially through the electrical bore 237 (e.g., FIG. 7). Additionally, the solenoid casing 299 encases a portion of the other components of the wire assembly 295 such that the wire assembly can pass through the electrical bore 237. Furthermore, the seal member 298 is disposed about a portion of the solenoid casing 299 and is configured to engage a wall of the housing defining the electrical bore 237 to form a fluid tight seal. Thus, an electrical current can be conveyed from a region substantially outside the fluid reservoir 201 (e.g., from an electrical source operably coupled to the connector 297) to a volume inside the fluid reservoir 201 (e.g., the solenoid assembly 285) via the wire assembly 295.

The solenoid assembly 285 includes a coil 286, an upper plate 287, a lower plate 288, an armature 291, an actuator rod 292, a spring 293, and an armature cover 294. Portions of the solenoid assembly 285 can be substantially similar in form and function to known solenoid assemblies. Thus, a detailed discussion of the form and function of a solenoid is not described herein. The lower plate 288 of the solenoid assembly 285 includes a protrusion 289 and a bottom portion 290. The protrusion 289 is configured to be disposed within the coil 286 and receives a portion of the actuator rod 292. The actuator rod 292 and the lower plate 288 are configured such that the actuator rod 292 can freely move within and/or through the lower plate 288 when the solenoid assembly 285 is energized.

The armature cover 294 is disposed within the coil 286 and can be coupled to at least the upper plate 287. In this manner, the solenoid assembly 285 can be configured to receive an electrical current from the wire assembly 295 to cause the armature 291 to move from a first position to a second position (e.g., through the lower plate 288). The actuator rod 292 is coupled to the armature 291 and is configured to be in contact with a portion of the actuator plate 241 such that movement of the armature 291 results in movement of the actuator plate 241. Similarly stated, the actuator rod 292 is arranged such that when the armature 291 is moved between a first position and a second position, the actuator rod 292 is moved between a first position and a second position, as described in further detail herein. In some embodiments, the spring 293 is configured to maintain the actuator rod 292 in contact with the armature 291 and/or the actuator plate 241.

As described above, with the mounting portion 283 of the cover 281 coupled to the mounting surface 218 of the housing 211, the lower plate 288 of the solenoid assembly 285 is disposed within the notch 217 of the mounting portion 216 and contacts a top surface of the filter 239. In this manner, the electrical system 280 is coupled to the housing 211 such that the filter 239 is in contact with the first surface 213 of the housing 211 and the bottom portion 290 of the lower plate 288. Similarly stated, the electrical system 280 and/or the lower plate 288 is coupled to the housing 211, but is offset from the first surface 213 to allow space within which the filter 239 is disposed. The offset coupling (i.e., the space between the electrical system 280 and the first surface 213, which defines the openings into the piston bores 233) provides a flow path for fluid within the reservoir 201 to enter the piston bores 233, as described below.

In some embodiments, the electrical system 280 can be coupled to the housing 211 such that the filter 239 is elastically deformed (e.g., bends or reconfigures, as shown in FIG. 21). Furthermore, the elastic deformation is such that the filter 239 exerts a reaction force on the bottom portion 290 of the lower plate 288 and the first surface 213 of the housing 211, thereby maintaining a first end of the filter 239 in contact with the bottom portion 290 and a second end of the filter 239 in contact with the first surface 213.

Figure 22:
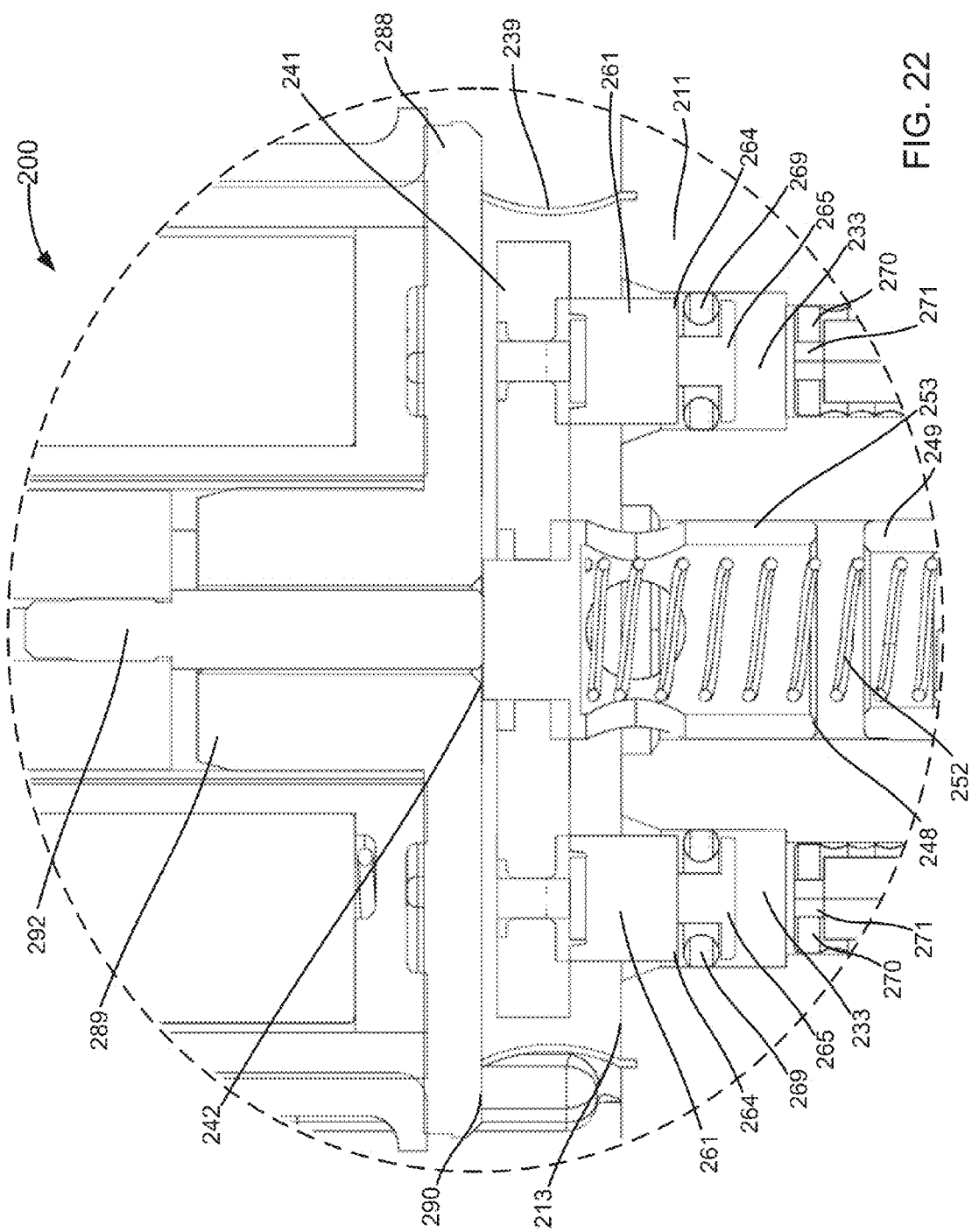
FIG. 22 is an enlarged view of a portion of the fluid transfer assembly in the first configuration, labeled as region A in FIG. 21.
Figure 23:
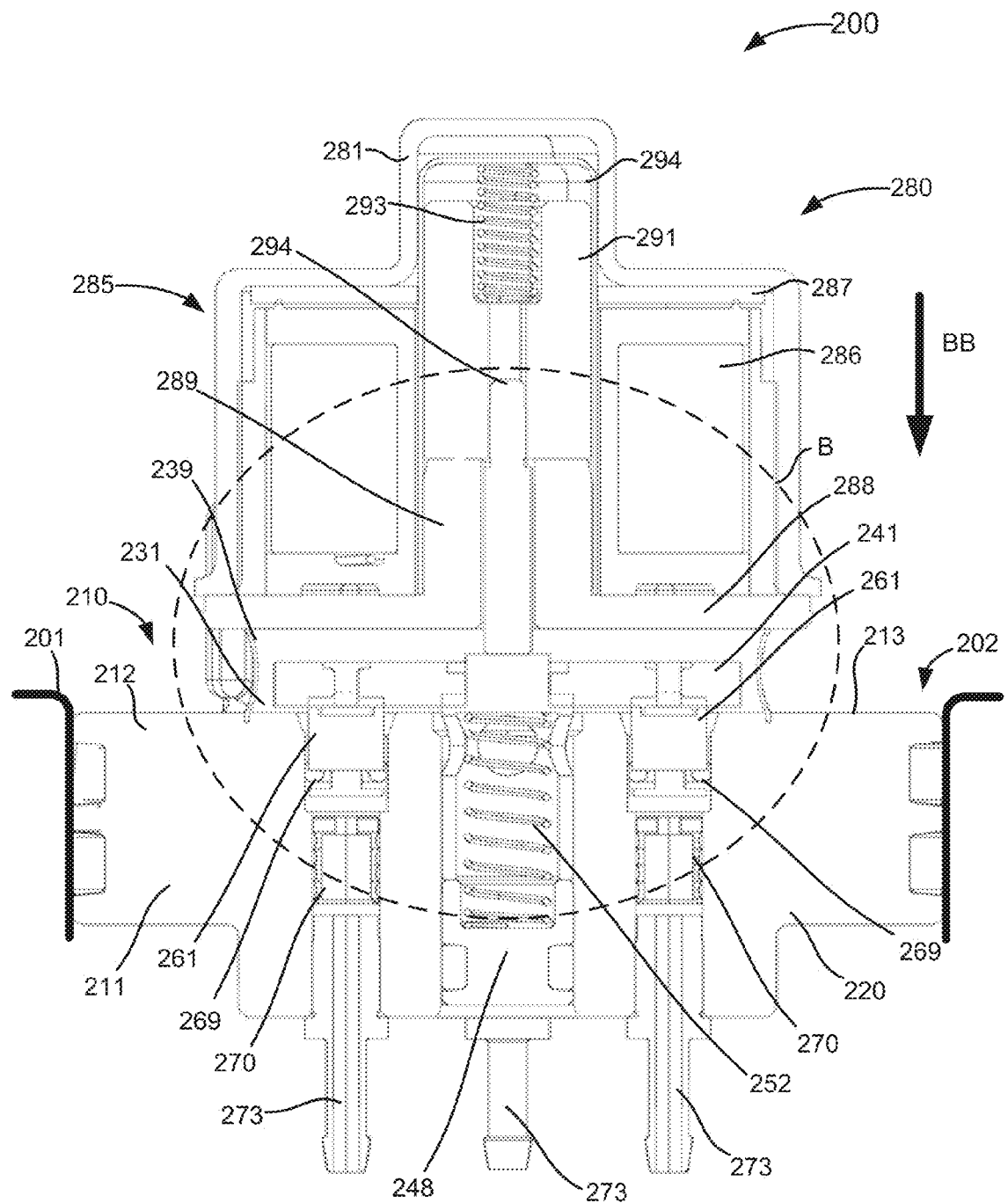
FIG. 23 is a cross-sectional view of the fluid transfer assembly illustrated in FIG. 3 taken along the line 21-21, in a second configuration.
Figure 24:
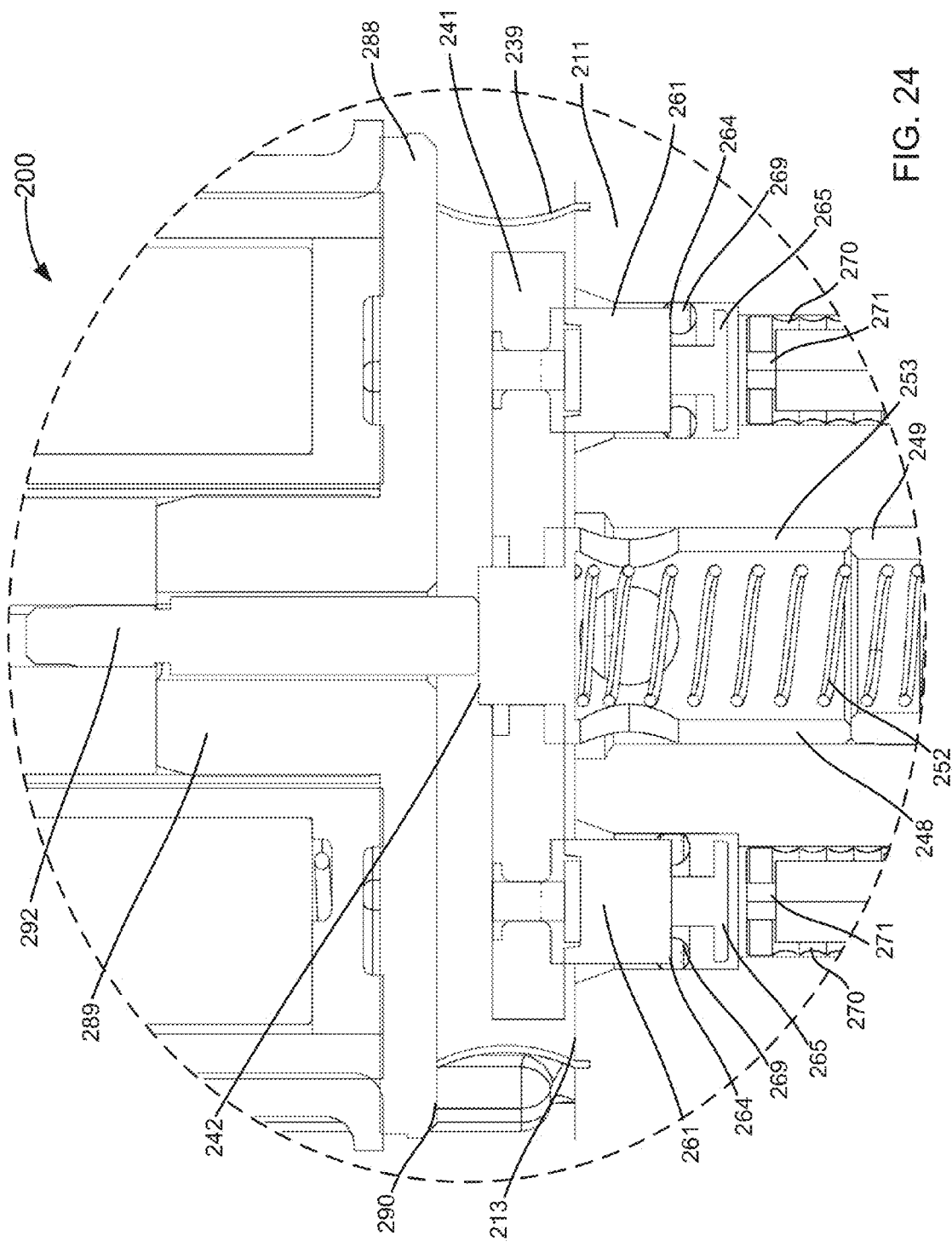
FIG. 24 is an enlarged view of a portion of the fluid transfer assembly in the second configuration, labeled as region B in FIG. 23.
Figure 25:
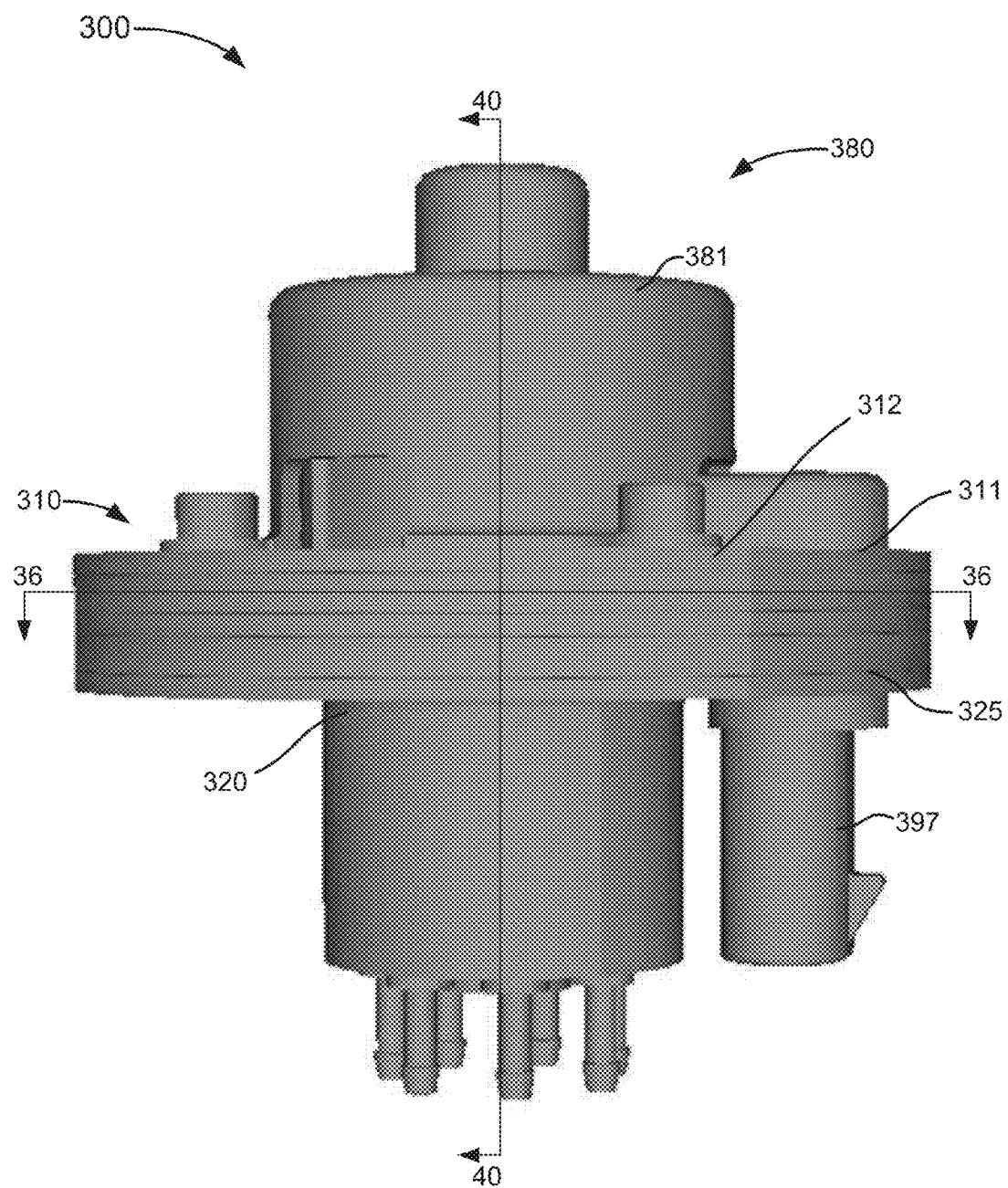
FIG. 25 is a front view of a fluid transfer assembly, according to an embodiment.
Figure 26:
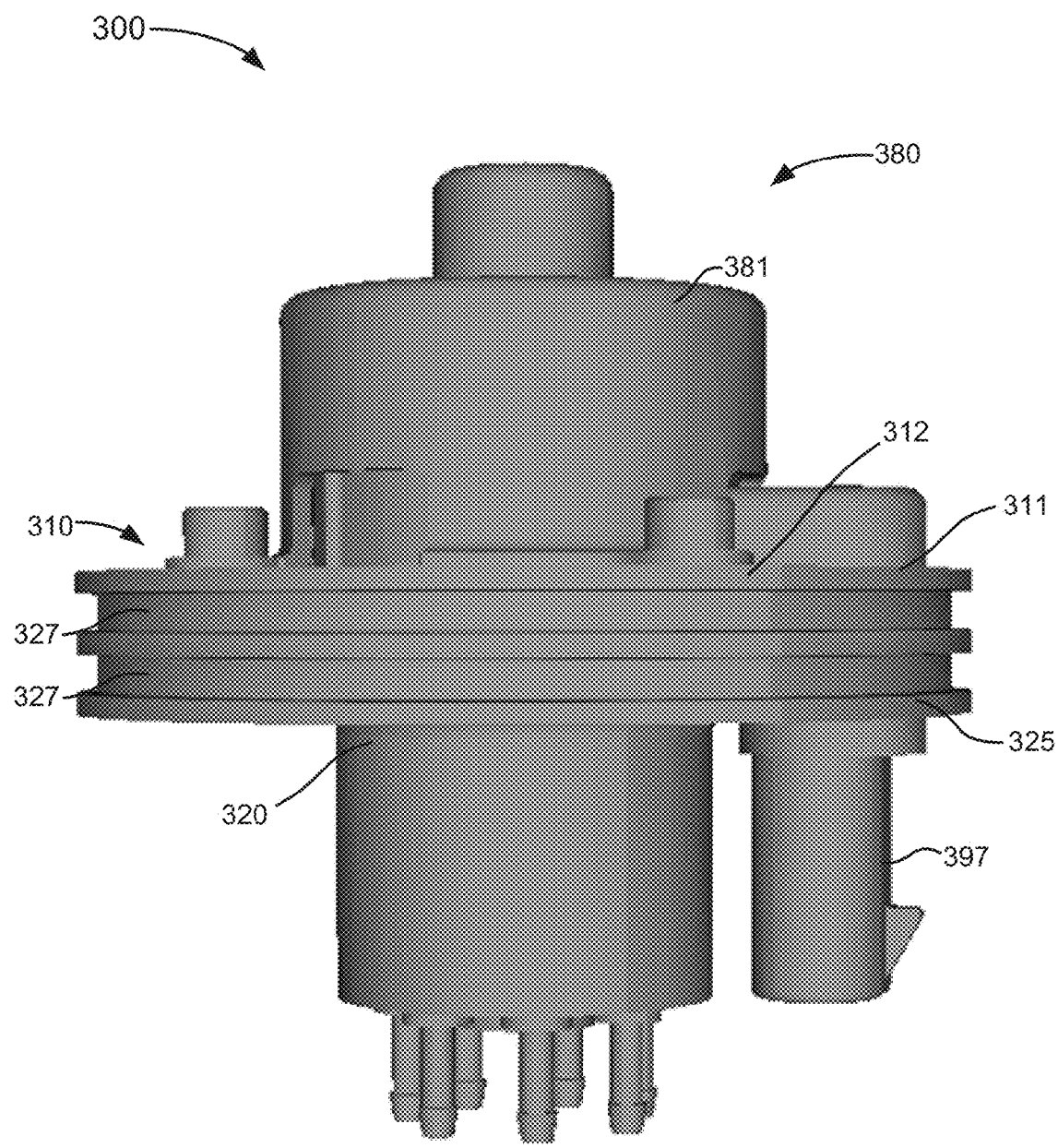
FIG. 26 is a front view of the fluid transfer assembly illustrated in FIG. 25 with sealing members removed.
Figure 27:
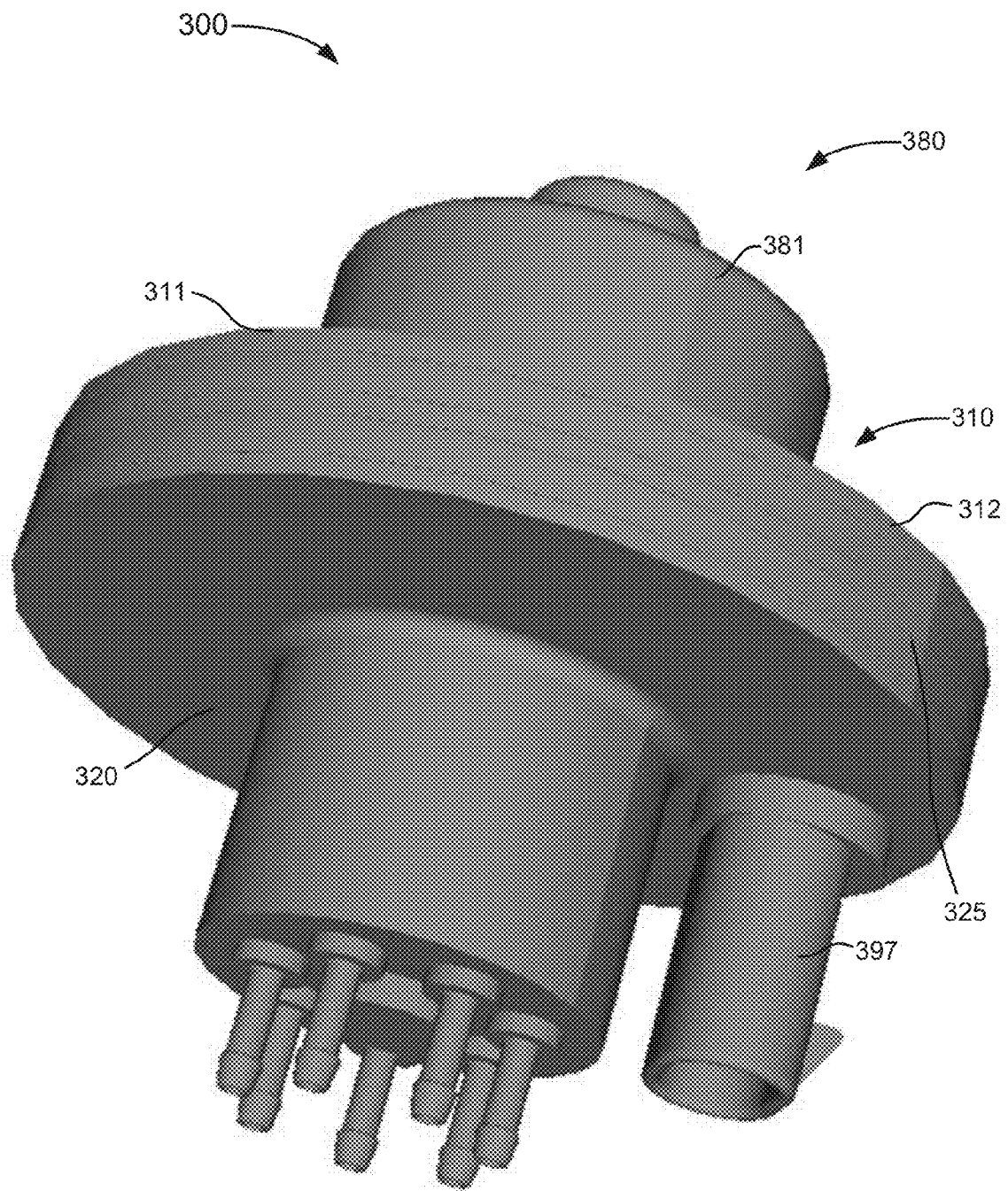
FIG. 27 is a bottom perspective view of the fluid transfer assembly illustrated in FIG. 25.
Figure 28:
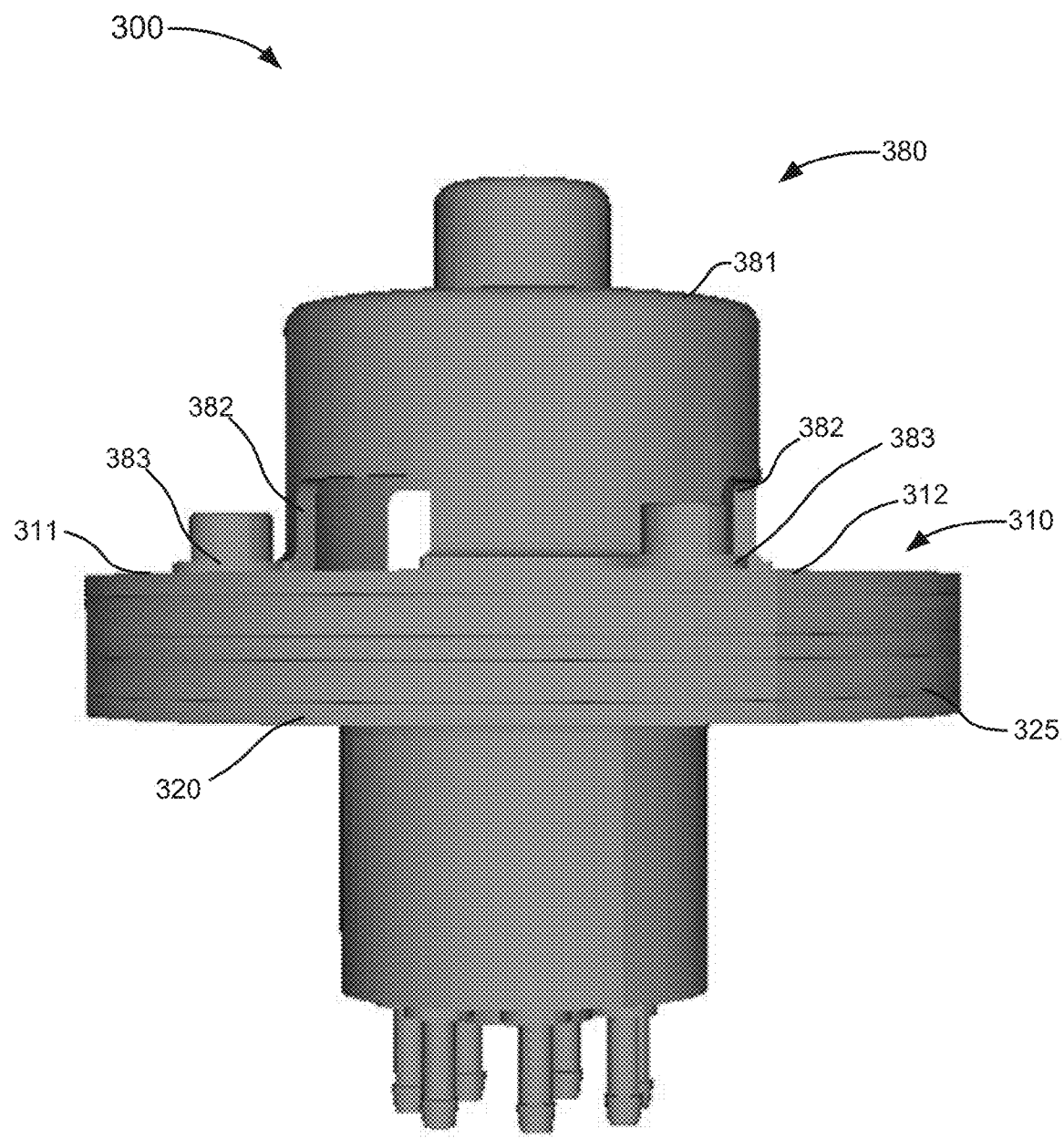
FIG. 28 is a front view of a portion of the fluid transfer assembly illustrated in FIG. 25.
Figure 29:
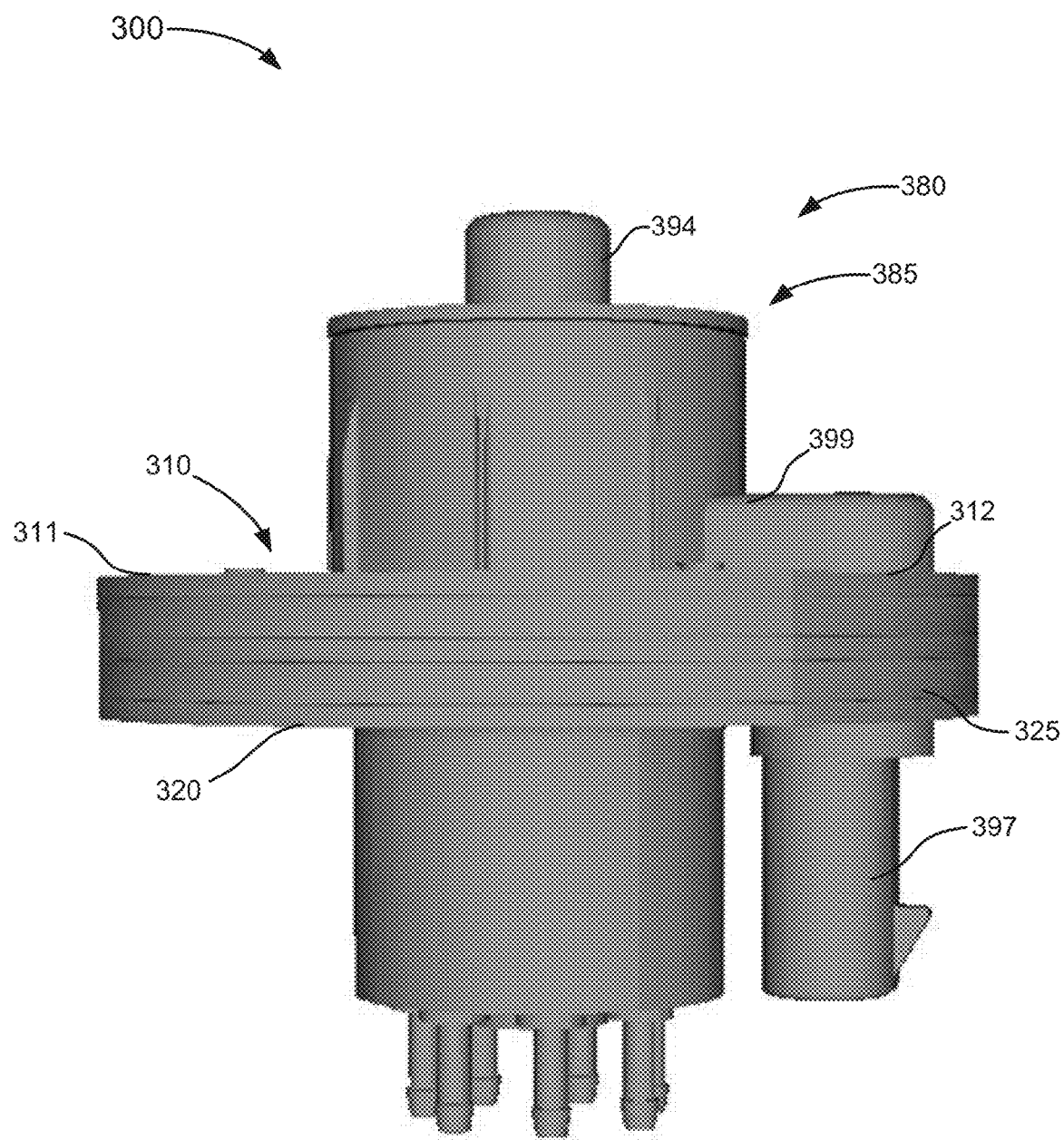
FIG. 29 is a front view of the fluid transfer assembly illustrated in FIG. 25 with a cover removed.
Figure 30:
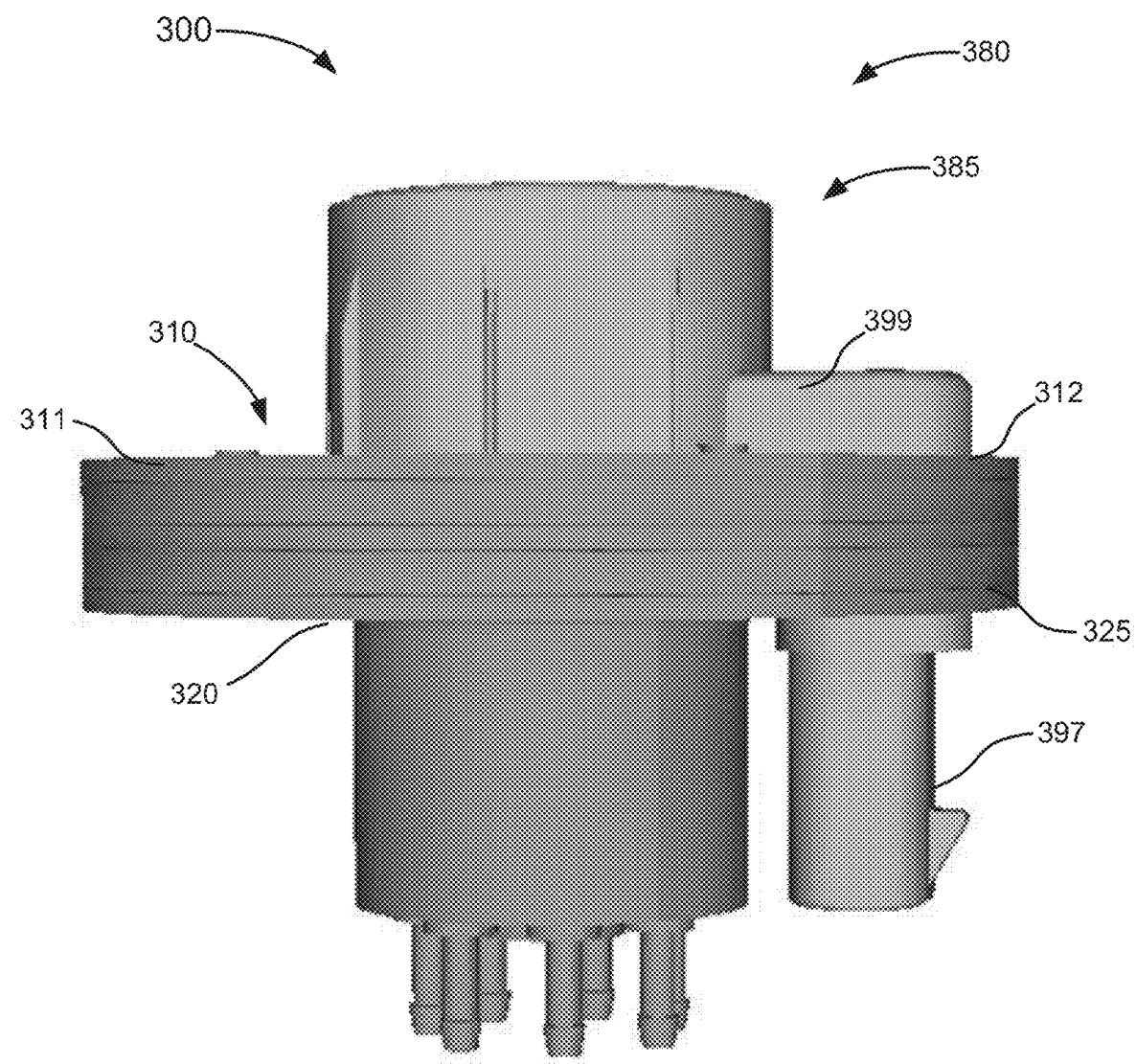
FIG. 30 is a front view of a portion of the fluid transfer assembly illustrated in FIG. 25.
Figure 31:
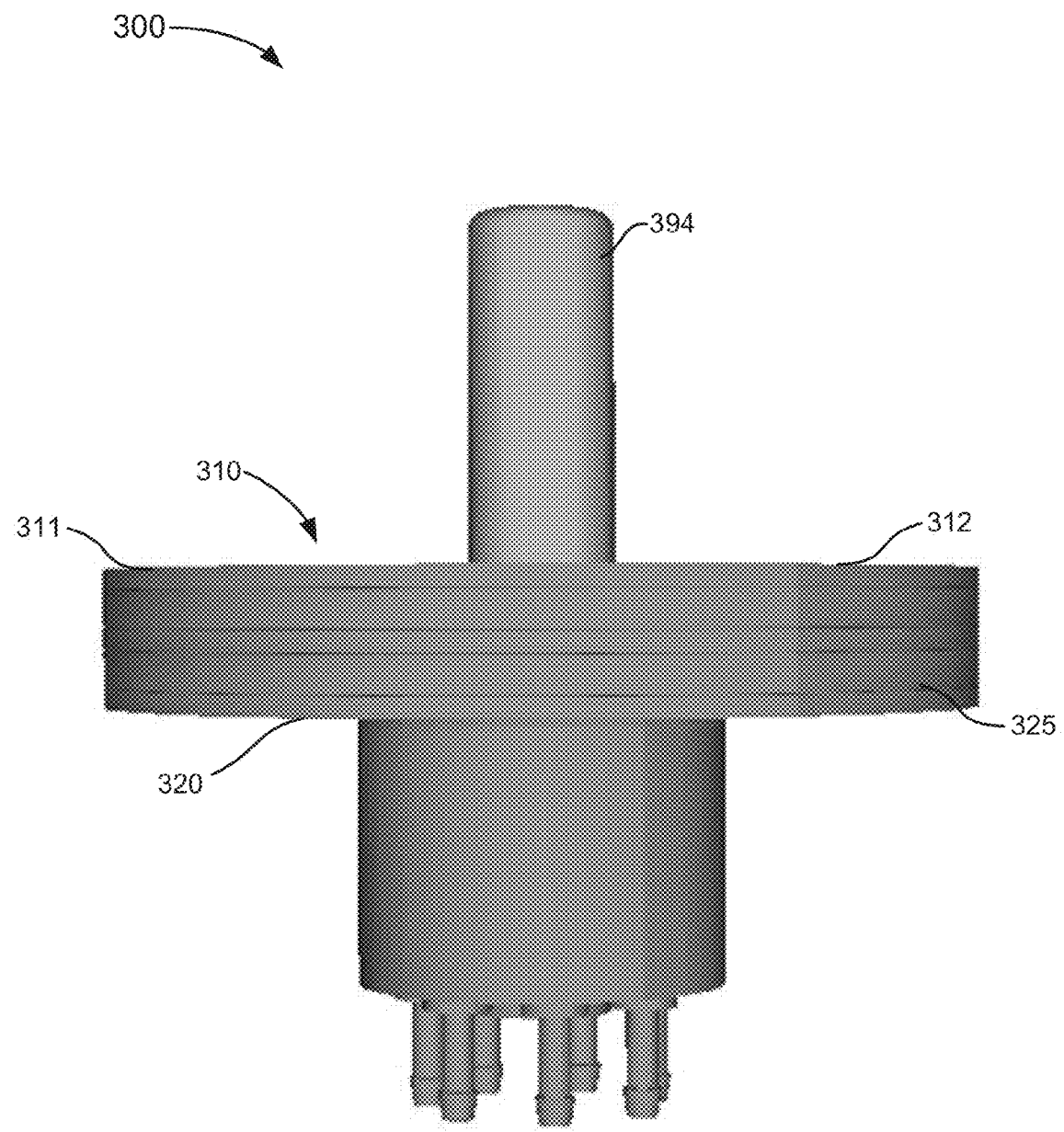
FIG. 31 is a front view of a portion of the fluid transfer assembly illustrated in FIG. 25.
Figure 32:
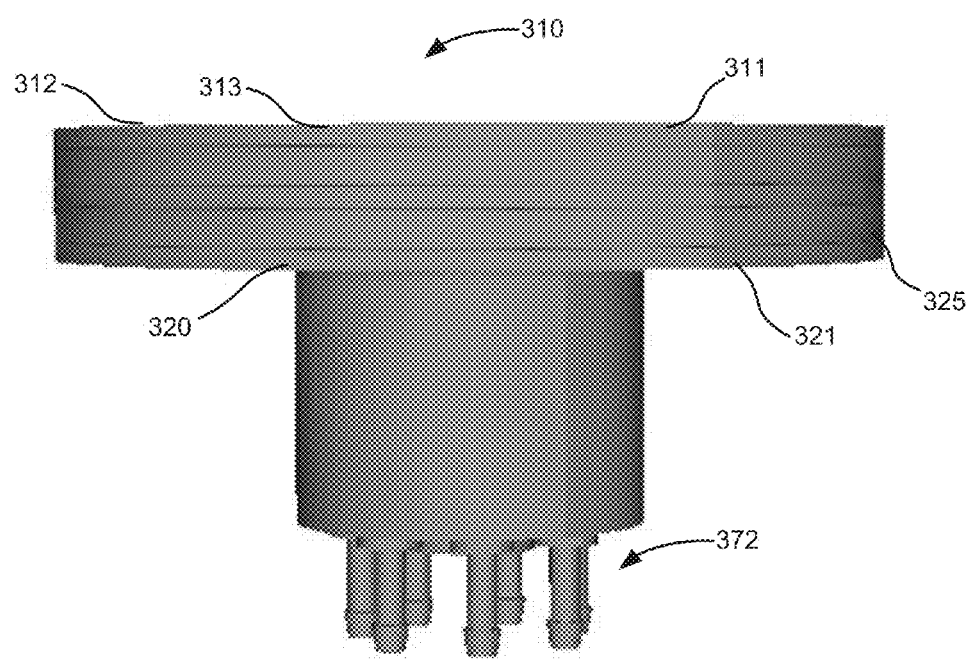
FIG. 32 is a front view of a pump subassembly included in the fluid transfer assembly illustrated in FIG. 25.
Figure 33:
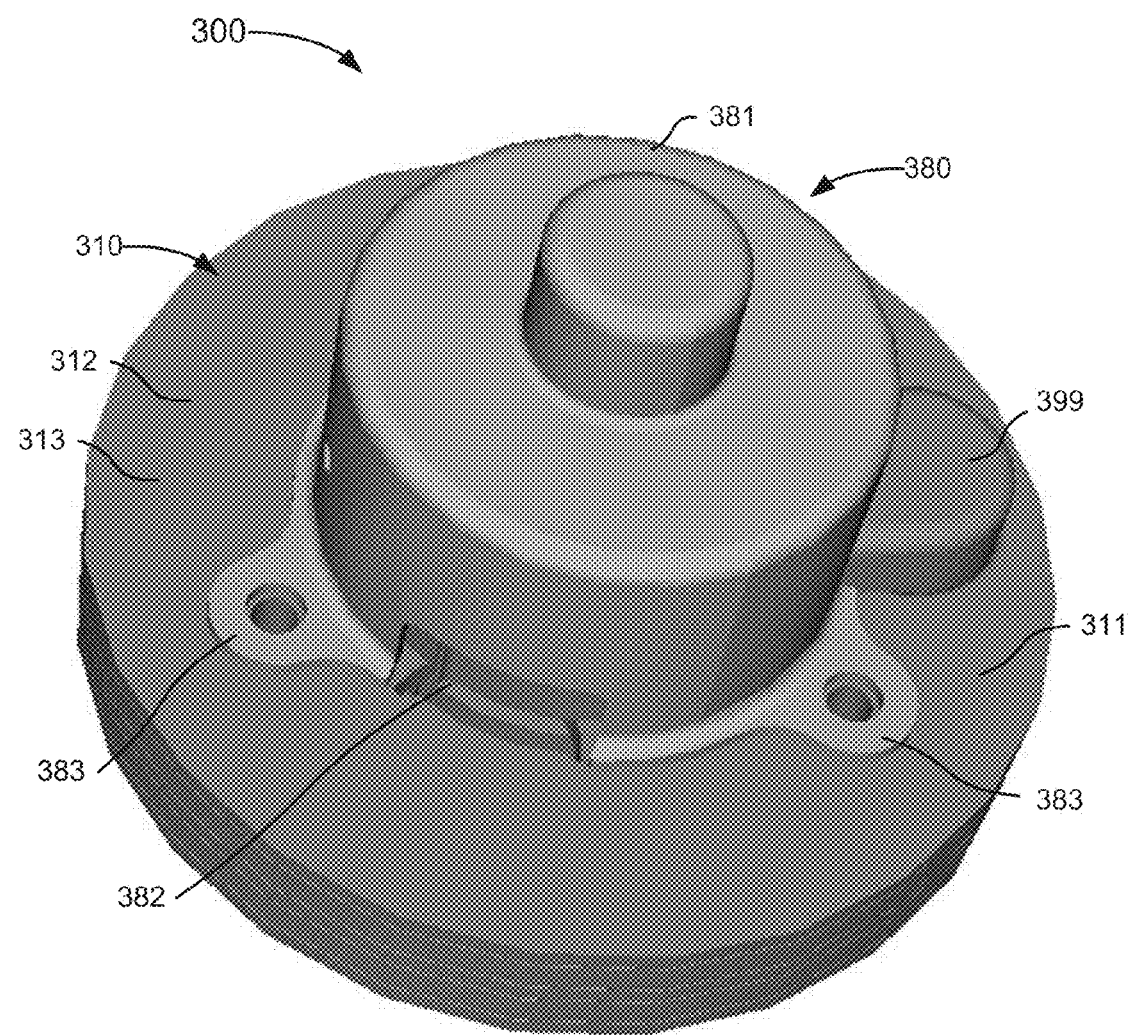
FIG. 33 is a top perspective view of the fluid transfer assembly illustrated in FIG. 25.
Figure 34:
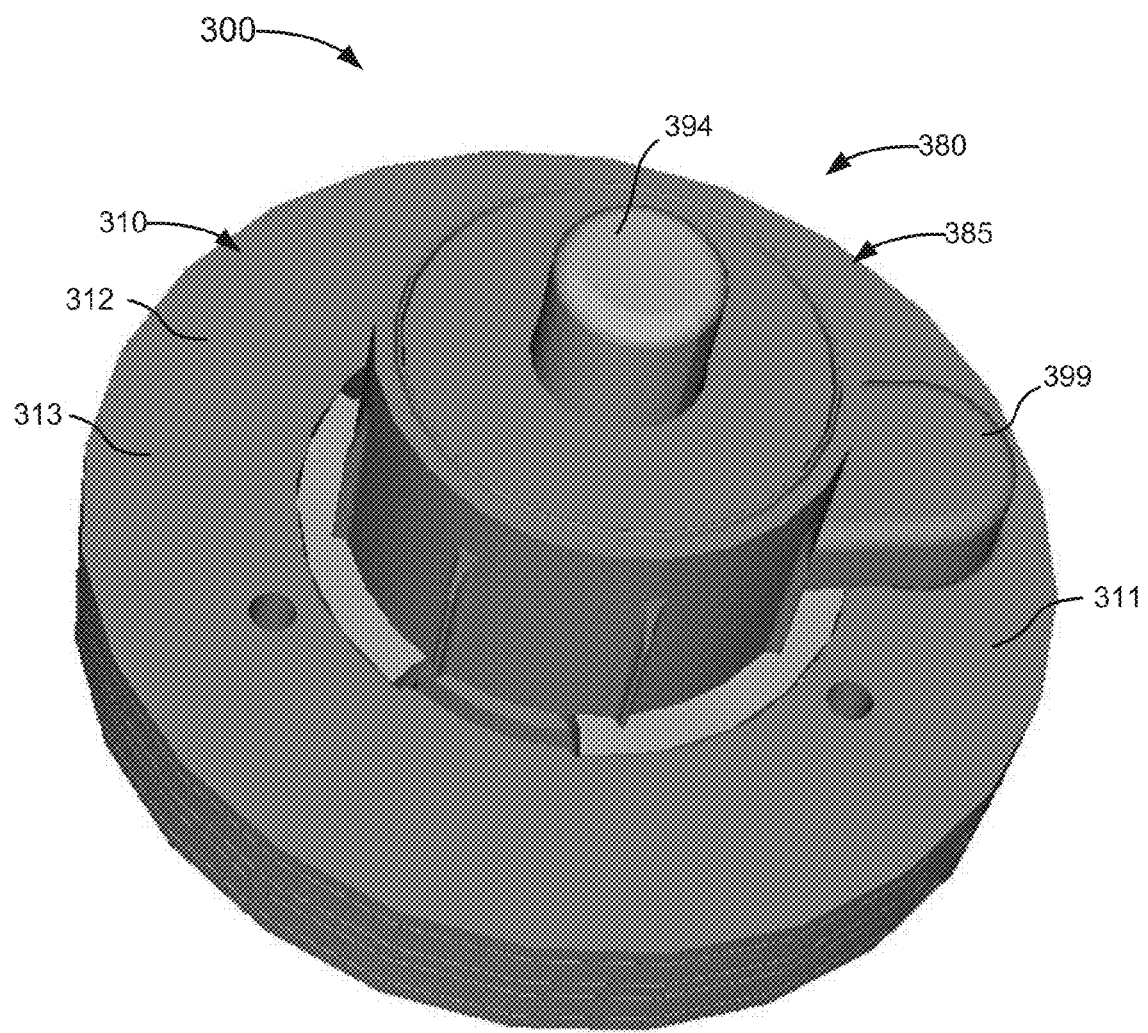
FIG. 34 is a top perspective view of the fluid transfer assembly illustrated in FIG. 25 with the cover removed.

Referring to FIGS. 21-24, the fluid transfer assembly 200 can be configured to move between the first configuration (the "intake configuration" when the solenoid assembly 285 is not energized, see, e.g., FIGS. 21 and 22) and the second configuration (the "pumping configuration" when the solenoid assembly 285 is energized, see, e.g., FIGS. 23 and 24). As shown in FIG. 21, the fluid transfer assembly 200 can be in the first configuration such that a portion of the fluid transfer assembly 200 is disposed within an interior volume of a fluid reservoir 201. As described above, the seal portion 225 of the housing 211 is configured to engage the wall defining a recess 202 of the reservoir 201. In this manner, the seal portion 225 and the reservoir 201 define a fluid tight seal fluidically isolating the first portion 212 of the housing 211 from the second portion 220 of the housing 211. The arrangement of the fluid transfer assembly 200 with respect to the reservoir 201 is such that at least a portion of the electrical system 280, the filter 239, and the first portion 212 of the housing 211 are in fluid communication with a fluid contained within the interior volume of the reservoir 201.

In this manner, a fluid within the reservoir 201 can flow though the filter 239 and enter a cavity 231 defined between the bottom portion 290 of the lower plate 288 and the first surface 213 of the housing 211. With the fluid transfer assembly 200 in the first configuration, the piston elements 260 are in the first piston element configuration, as shown in FIG. 22. As described above, the seal member 269 is movably disposed within the channel 267 of the pumping members 261. Thus, in the first configuration, the seal member 269 is disengaged from (e.g., not in contact with) the bottom surface 264 of the body 263 included in the pumping members 261. Therefore, the fluid can flow past the seal member 269 and through the fluid passageways 268 (FIG. 14) defined by the base 265 to fill the piston bore 233.

In response to an electrical signal (e.g., a current produced by the electrical source), the fluid transfer assembly 200 moves from the first configuration to the second configuration, as shown in FIGS. 23 and 24. More particularly, the electrical signal (e.g., current) can travel through the wire assembly 295 (FIGS. 19 and 20) and to the coil 286 of the solenoid assembly 285. With the current applied to the coil 286, the coil 286 exerts a magnetic force on the armature 291 to urge the armature 291 to move from the first position to the second position as indicated by the arrow BB in FIG. 23. The arrangement of the armature 291 is such that the armature 291 transfers at least a portion of the force to the actuator rod 292 and moves the actuator rod 292 in the direction BB. Furthermore, the actuator rod 292 is in contact with a surface of the actuator plate 241. Therefore, the actuator rod 292 places the pump element 240 in the second configuration (i.e., the pumping configuration).

With the pump element 240 moved from the first configuration to the second configuration, the actuator plate 241 is moved towards the first surface 213 of the housing 211, thereby placing the fluid between the actuator plate 241 and the first surface 213 under pressure. As seen in FIG. 24, the movement of the pump element 240 to the second configuration urges the seal member 269 of the piston elements 260 to move within the channel 267 of the pumping members 261. In this manner, the seal member 269 engages the bottom surface 264 included in the body 263 of the pumping members 261 and fluidically isolates a volume of fluid upstream of the seal member 269 from a volume of fluid downstream of the seal member 269. Moreover, a portion of the seal member 269 slidably engages the wall of the housing 211 that defines the piston bore 233, thereby substantially isolating the fluid within the piston bore 233 (i.e., the pumping chamber) from the reservoir 201. Thus, the movement of the pumping element 261 within the piston bore 233 increases the pressure within the piston bore 233 and urges the valve member 270 to move to the open configuration such that the fluid can flow through the channel 271 defined by the valve member 270 and through the channel 276 defined by the outlet port 273. Thus, a portion of the fluid within the interior volume of the reservoir 201 is delivered to a volume outside of the reservoir 201.

As the pump element 240 is moved from the first configuration to the second configuration, the spring 252 included in the bias element 248 is compressed between the base 249 (FIG. 13) and the coupling member 253. For example, as shown in FIG. 24, the movement of the actuator plate 241 places the coupling member 253 in contact with the base 249, thus limiting further movement of the actuator plate 241. In this manner, the position of the base 249 within the bias element bore 232 can control the length of stroke of the pump element 240 (e.g., the closer the base 249 is placed closer to the second surface 221 the longer the stroke is of the pump element 240). Therefore, with the spring 252 compressed and when the electrical signal (i.e., current) is removed from the solenoid assembly 285, the spring 252 of the bias element 248 can expand to move the coupling member 253 to the first position (see e.g., FIG. 22) and the pump element 240 back towards the first configuration (i.e., and intake stroke). The actuator plate 241 is moved in a direction opposite the arrow BB towards the first configuration. The movement of the pump element 240 towards the first configuration moves the actuator rod 292 and the armature 291 in the direction opposite the arrow BB. Thus, the fluid transfer assembly 200 is returned to the first configuration. The "return" movement is limited by contact between the actuator plate 241 and/or the fitting 254 and the lower plate 288, as shown in FIG. 21. With the fluid transfer assembly 200 in the first configuration, the electrical source can again supply a flow of current to the solenoid assembly 285 such that the pumping process is repeated any number of times.

FIGS. 25-42 illustrate a fluid transfer assembly according to an embodiment. A fluid transfer assembly 300 includes a pump subassembly 310 and an electrical system 380. The fluid transfer assembly 300 is configured to be coupled to a fluid reservoir. More specifically, in some embodiments, the fluid transfer assembly 300 can be coupled to a fluid reservoir such that a first portion of the fluid transfer assembly 300 is disposed within a volume defined by the fluid reservoir and a second portion of the fluid transfer assembly 300 is disposed outside the volume defined by the fluid reservoir (see, e.g., FIG. 41).

The fluid transfer assembly 300 can be any suitable shape, size, or configuration and can include components formed from any suitable material or any suitable combination of materials. Furthermore, some portions of the fluid transfer assembly 300 can be substantially similar to portions of the fluid transfer assembly 200 described above with reference to FIGS. 3-24. Therefore, the portions of the fluid transfer assembly 300 are not described in further detail herein.

Referring to FIGS. 25-36, the electrical system 385 includes a cover 381, a solenoid assembly 385, and a wire assembly 395. The cover 381 is configured to substantially enclose at least a portion of the solenoid assembly 385 and the wire assembly 395 and includes a mounting portion 383. The mounting portion 383 of the cover 381 is configured to be coupled to a first surface 313 of a housing 311 included in the pump subassembly 310. In addition, the cover 381 includes a set of notches 382 configured to allow a flow of fluid through the cover 381 and into the fluid transfer assembly 300.

The wire assembly 395 includes a connector 397, a seal member 398, and a solenoid casing 399. A portion of the connector 397 is configured to extend through one of the notches 382 defined by the cover 381 and be passed through the electrical bore 337. In this manner, the connector 397 can be coupled to an external electrical source such as, for example, a control module of a vehicle. In some embodiments, the connector 397 is configured to accept a readily—available electrical connector from a vehicle's wiring harness. Furthermore, the seal member 398 is disposed about a portion of the connector 397 and is configured to engage a set of walls defining the electrical bore 337 to form a fluid tight seal. Thus, an electrical current can be passed from a region substantially outside a fluid reservoir (e.g., from an electrical source operably coupled to the connector 397) to a volume inside the fluid reservoir (e.g., the solenoid assembly 385) via the wire assembly 395.

In some embodiments, the connector 397 and the solenoid casing 399 can be monolithically formed. In other embodiments, the solenoid casing 399 can include a notch (not shown) configured to receive at least a portion of the connector 397. In some embodiments, the connector 397 can be an over-mold coupled to the housing 311.

Figure 35:
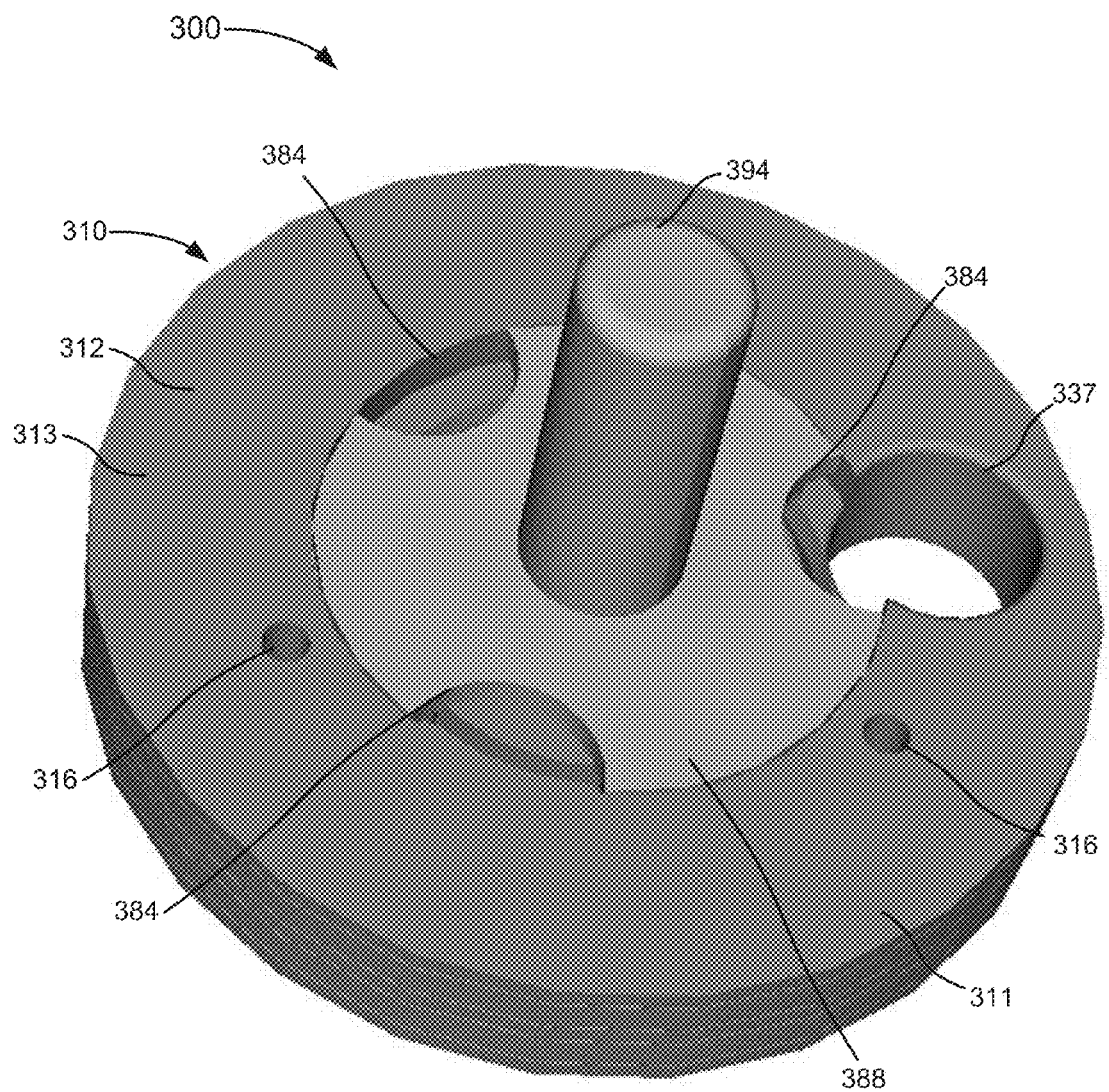
FIG. 35 is a top perspective view of a portion of the fluid transfer assembly illustrated in FIG. 25.
Figure 36:
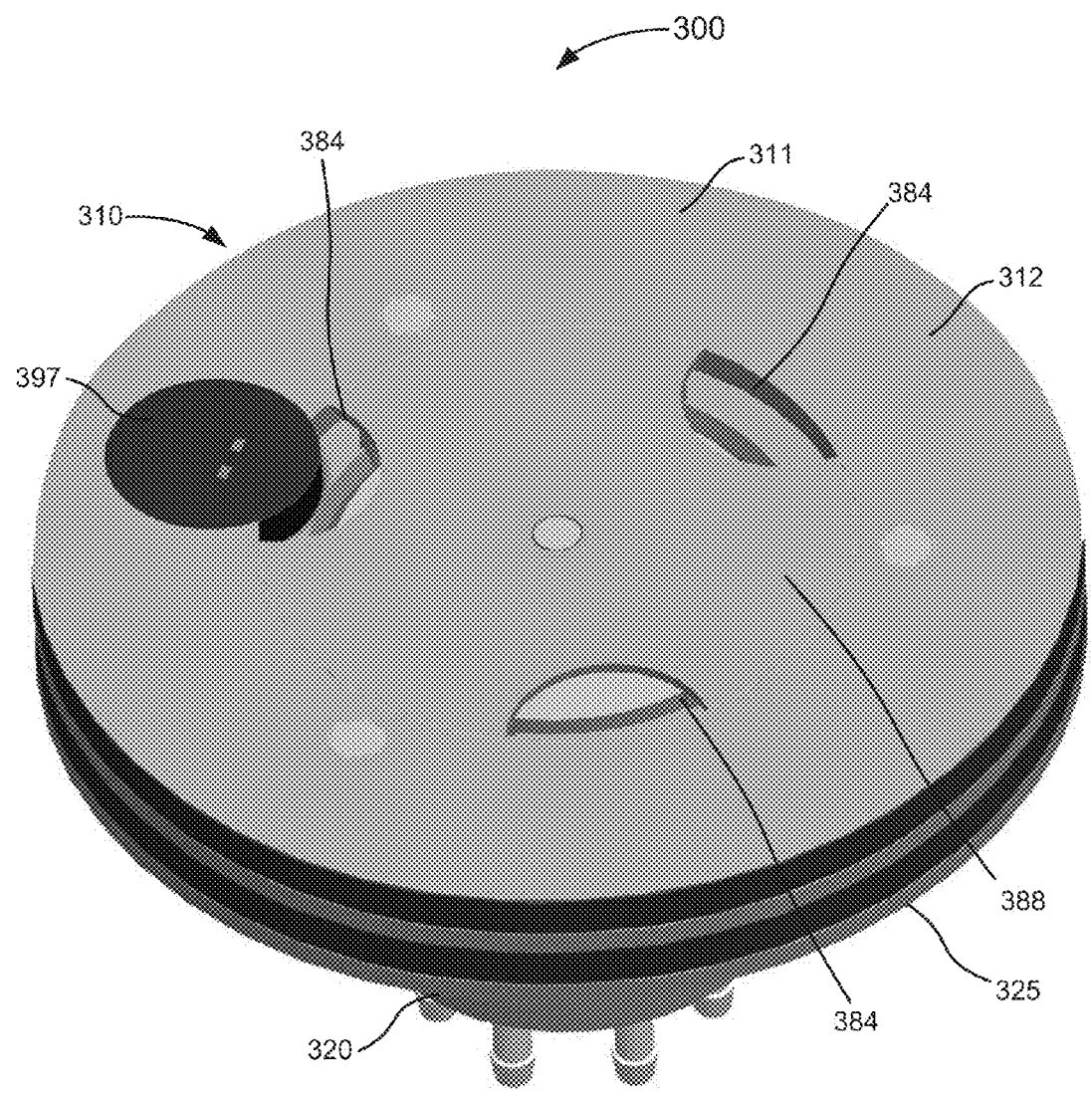
FIG. 36 is a perspective cross-sectional view of the fluid transfer assembly illustrated in FIG. 25 taken along the line 36-36.
Figure 37:
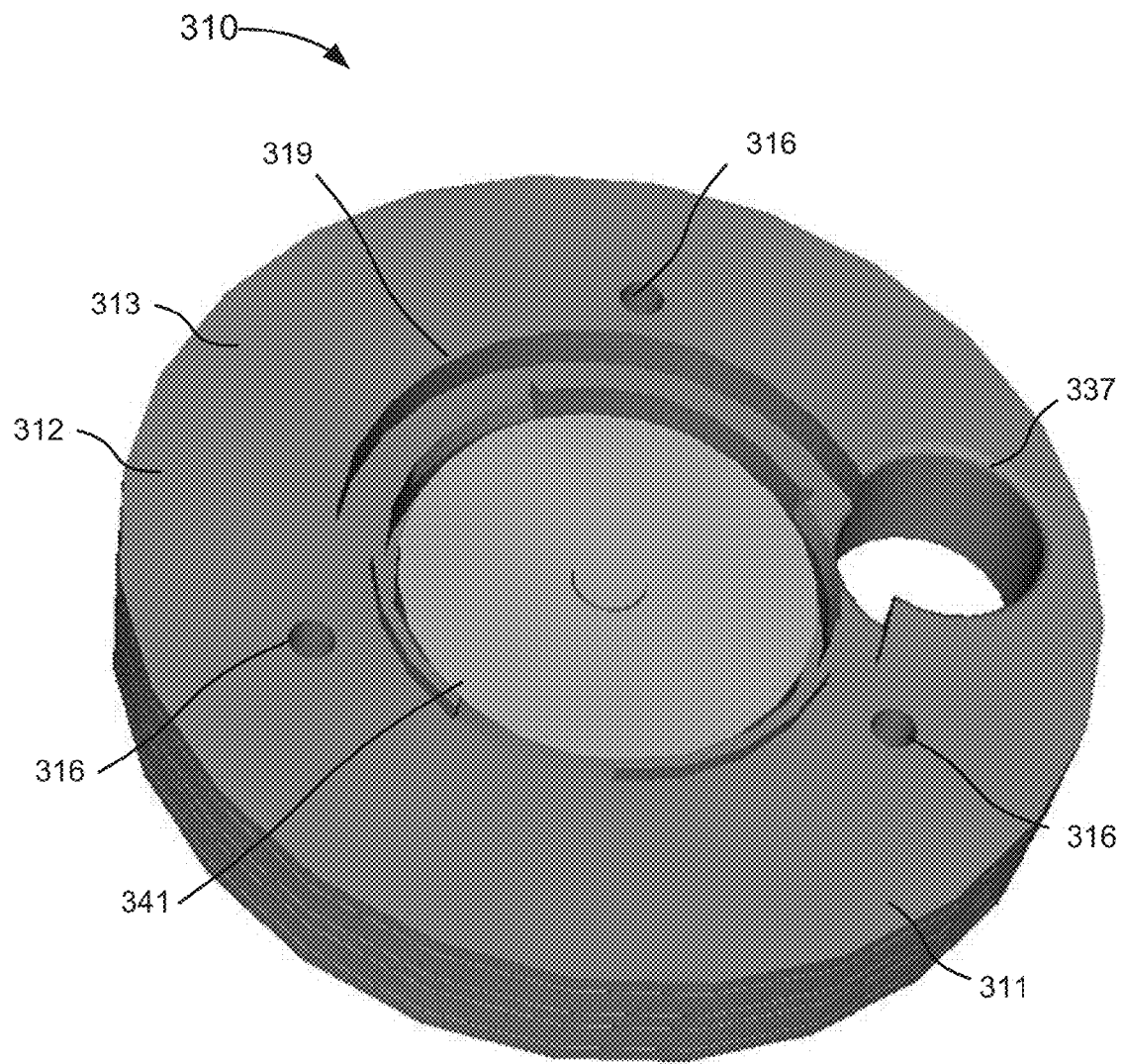
FIG. 37 is a top perspective view of a portion of the fluid transfer assembly illustrated in FIG. 25.

The solenoid assembly 385 can be substantially similar in form and function to the solenoid assembly 285 described above with reference to FIGS. 19 and 20. Therefore, portions of the solenoid assembly 385 are not described in detail herein. The solenoid assembly 385 differs, however, in the configuration of a lower plate 388 (as compared to the lower plate 288 of the solenoid assembly 285 described above). For example, as shown in FIGS. 35 and 36, the lower plate 388 includes a set of fluid openings 384. Expanding further, with the mounting portion 383 of the cover 381 is coupled to the first surface 313 of the housing 311 (see FIG. 33), the lower plate 388 is disposed within a recess 319 defined by the first surface of the housing 311 (FIG. 37). In this manner, the fluid openings 384 defined by the lower plate are configured to allow a flow of the fluid into a cavity 331 defined between the lower plate 388 and the recessed portion of the first surface 313 of the housing 311.

As shown in FIGS. 37-42, the pump subassembly 310 includes the housing 311 and a pump element 340. More specifically, the pump subassembly 310 is configured such that at least a portion of the pump element 340 is disposed within the housing 311 (see e.g., FIGS. 40-42). The housing 311 includes a first portion 312, a second portion 320, and a seal portion 325.

The seal portion 325 can be any suitable configuration and is disposed between the first surface 313 of the first portion 312 and a second surface 321 of the second portion 320. In this manner, the seal portion 325 is configured to engage a portion of a fluid reservoir 301 to form a fluid tight seal (see e.g., FIG. 41). The seal portion 325 defines a set of grooves 327 (see e.g., FIG. 26) configured to receive a set of seal member 328 therein (see e.g., FIGS. 40 and 41). The seal members 328 can be any suitable seal member. For example, in some embodiments, the seal members 328 can be substantially similar to the seal members 228, described above with respect to FIG. 6.

Figure 41:
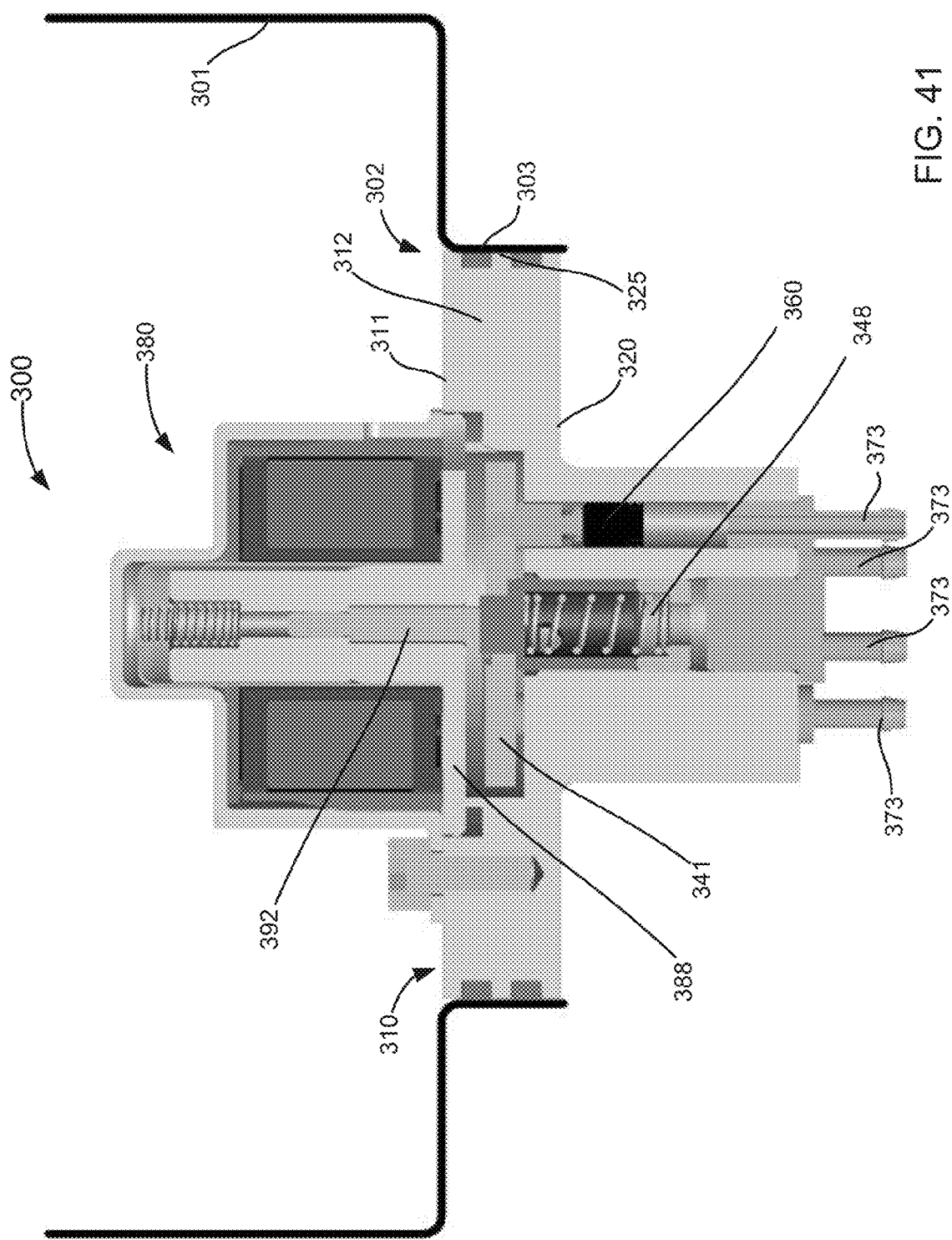
FIG. 41 is a cross-sectional illustration of the fluid transfer assembly of FIG. 40 coupled to an oil tank.
Figure 42:
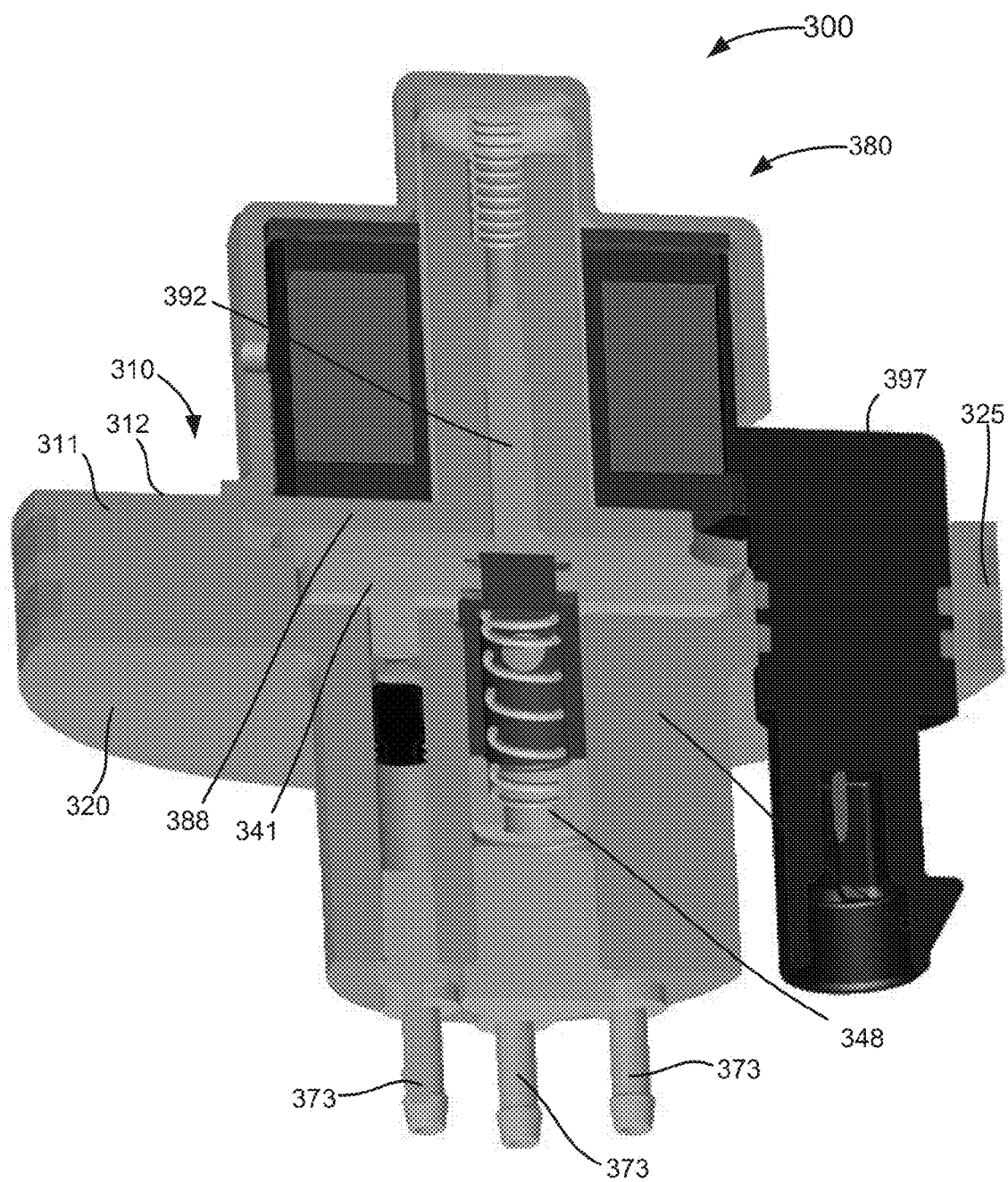
FIG. 42 is a perspective view of the fluid transfer assembly illustrated in FIG. 40.

Furthermore, the seal portion 325 can include a coupling member and/or retention member (not shown) to couple the housing 311 to and/or within the reservoir 301. For example, in some embodiments, the seal portion 325 can include a snap ring configured to maintain at least the seal portion 325 in contact with a portion of the reservoir 301 (FIG. 41). In other embodiments, the seal portion 325 can include a clip, a threaded nut, and/or any other suitable retention member. In this manner, the seal portion 325 (e.g., at least a seal member included in the seal portion 325) is configured to engage a set of walls 303 of the reservoir 301 to define a fluid tight seal. Similarly stated, the seal portion 325 can engage the walls 303 of the reservoir 301 such that an inner volume of the reservoir 301 is fluidically isolated from a volume outside the reservoir 301. Said yet another way, the seal portion 325 can engage the walls 303 of the reservoir 301 such that the first surface 313 included in the first portion 312 is fluidically isolated from the second surface 321 included in the second portion 320.

The housing 311 defines a bias element bore 332, an electrical bore 337, and seven piston bores 333. In some embodiments, the housing 311 can define less than seven piston bores 333. In other embodiments, the housing 311 can define more than seven piston bores 333. The bias element bore 332 and the piston bores 333 are configured to extend through the recessed portion of the first surface 313 of the first portion 312 and the second surface 321 included in the second portion 320.

Figure 38:
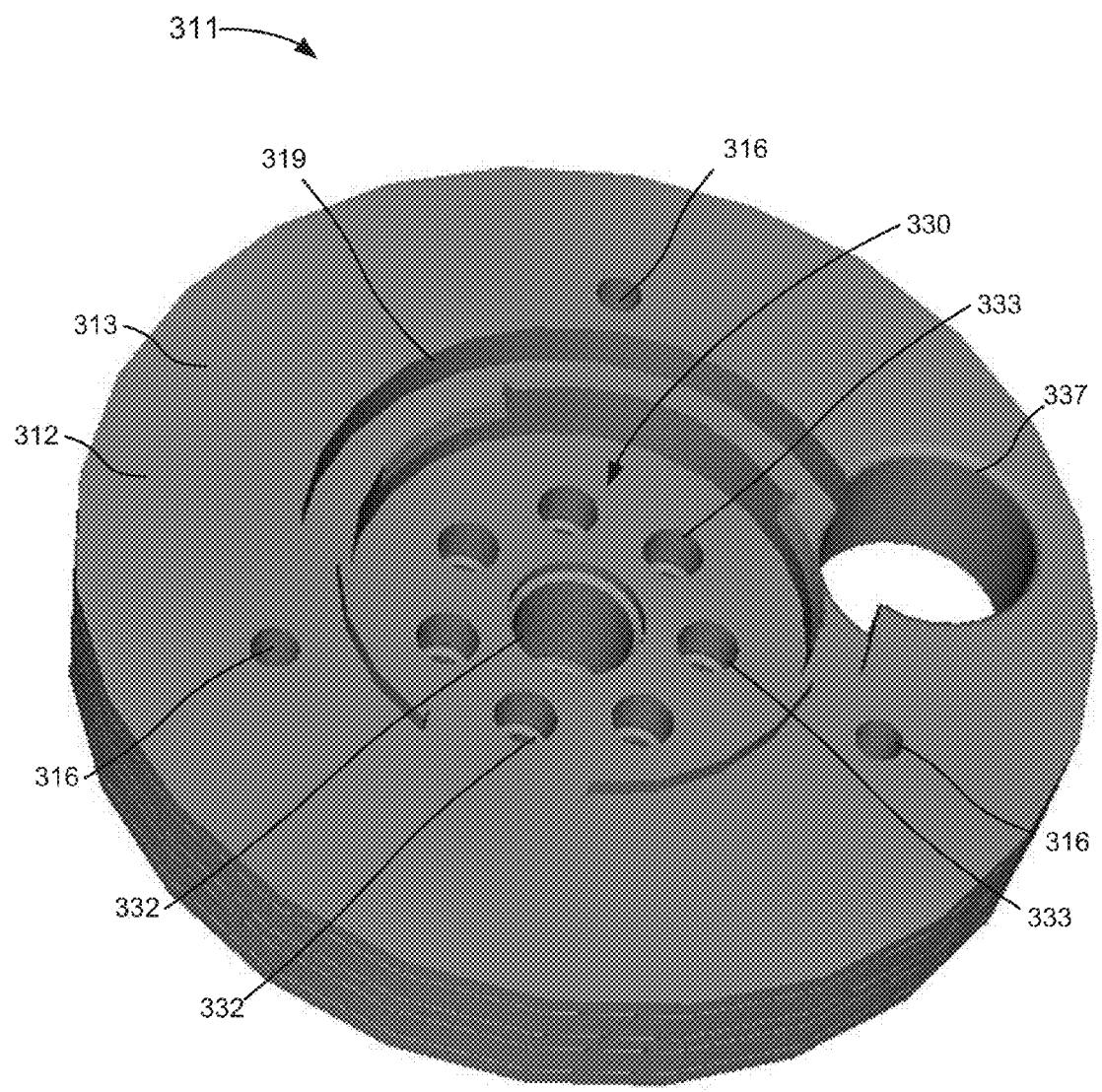
FIG. 38 is a top perspective view of a housing included in the fluid transfer assembly illustrated in FIG. 25.
Figure 39:
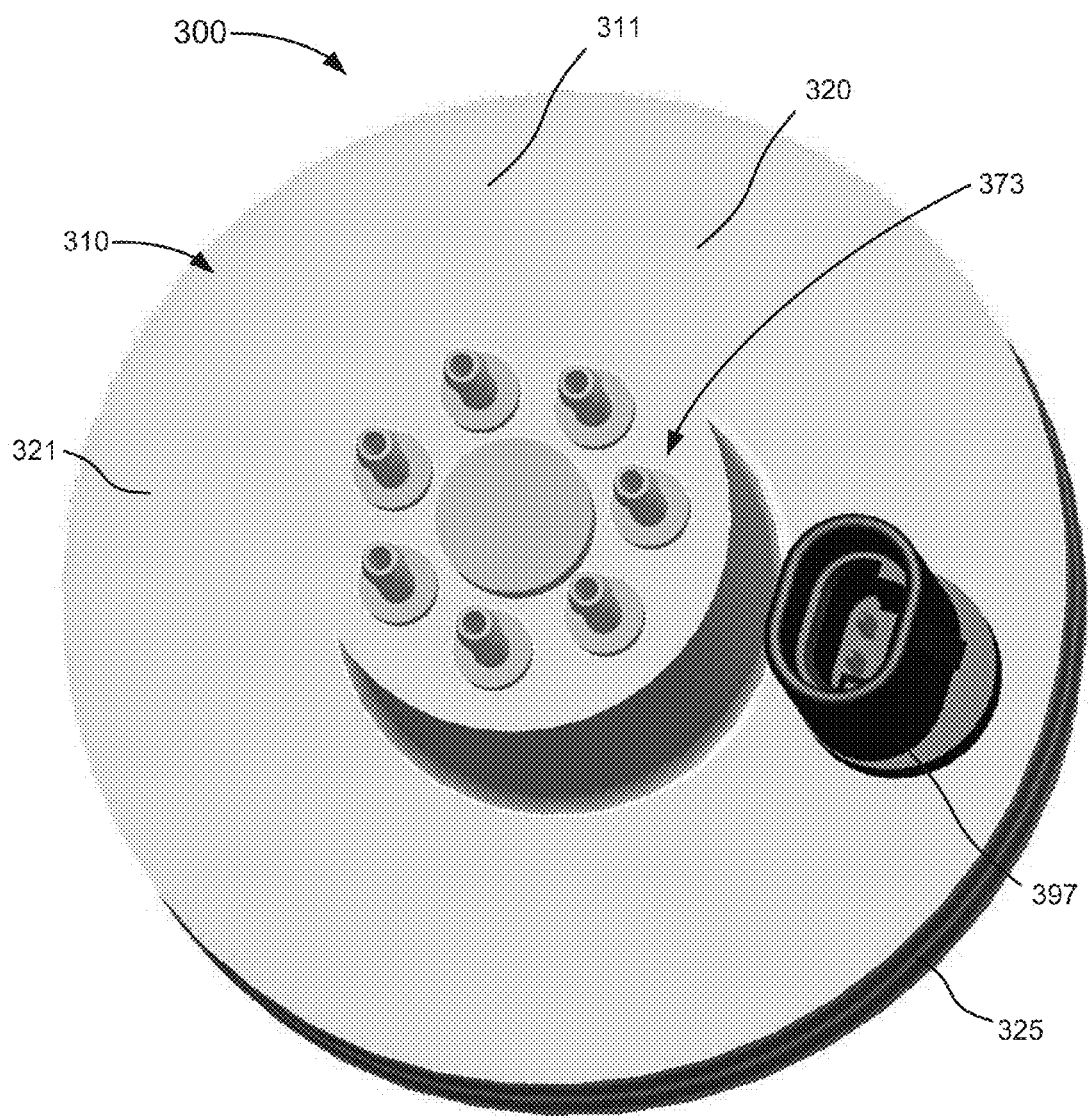
FIG. 39 is a bottom view of the fluid transfer assembly illustrated in FIG. 25.
Figure 40:
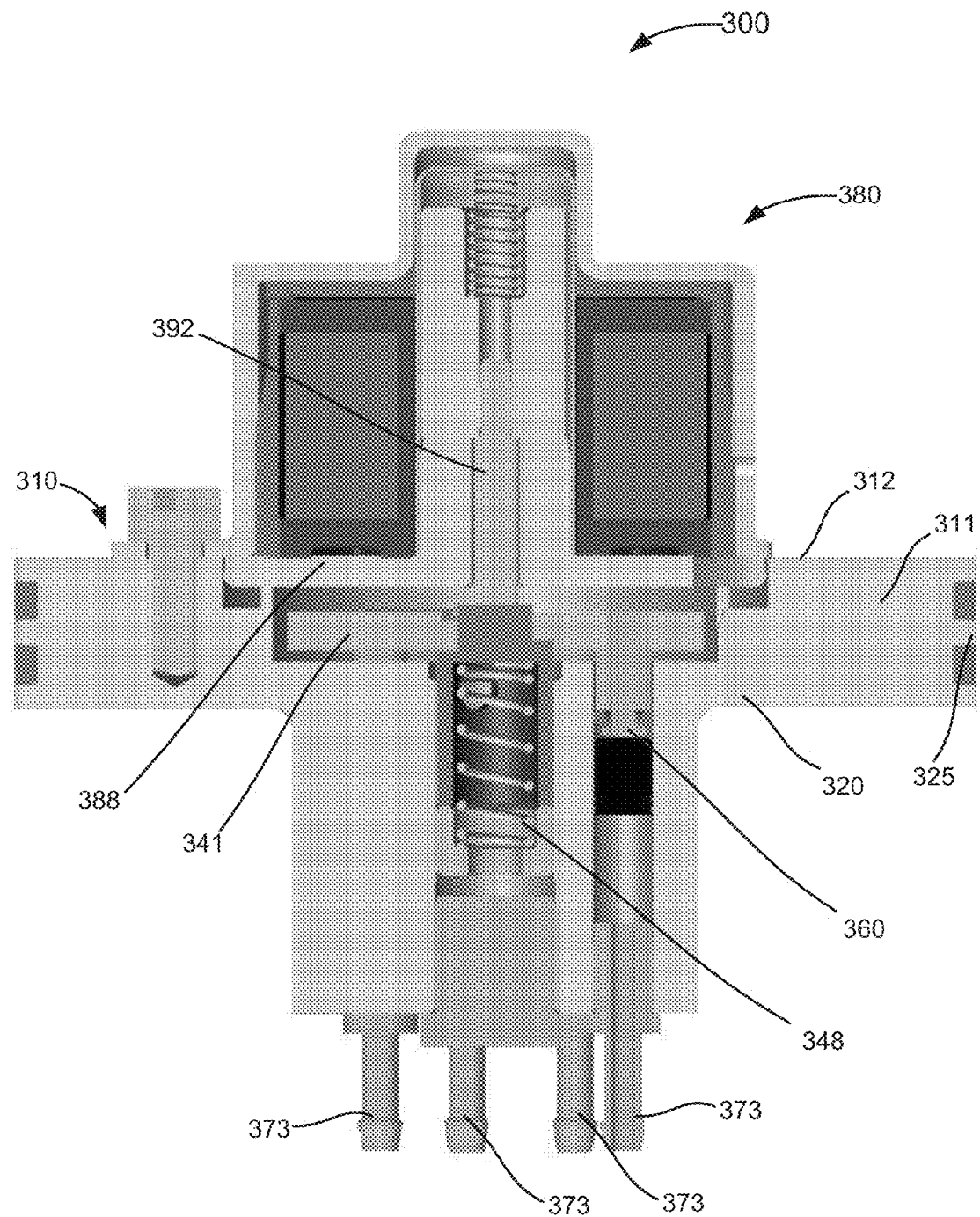
FIG. 40 is a cross-sectional view of the fluid transfer assembly illustrated in FIG. 25 taken along the line 40-40.

The bias element bore 332 and the piston bores 333 can be any suitable size or configuration. For example, in some embodiments, the bias element bore 332 and the piston bores 333 can be substantially similar in form and function to the bias element bore 232 and the piston bores 233, respectively, described above with reference to the fluid transfer assembly 200. While shown in FIG. 38 as defining specific diameters, it should be understood that the bias element bore 332 and the piston bores 333 can have any suitable diameter without changing the function of the bias element bore 332 and/or the piston bores 333. Furthermore, while the piston bores 333 are shown in FIG. 38 as having a substantially similar diameter, the diameters of the piston bores 333 can vary.

The pump element 340 includes an actuator plate 341, a bias element 348 and a set of piston elements 360. The actuator plate 341 can be any suitable configuration is configured to be coupled to the bias element 348 and the piston elements 360. While shown in FIGS. 25-42 as including seven piston elements 360, in some embodiments the pump element 340 can include and number of the piston elements 360. Furthermore, the number of piston elements 360 included in the pump element 340 is configured to correspond to the number of piston bores 333 defined by the housing 311.

The actuator plate 341, the bias element 348 and the piston elements 360 can be substantially similar in form and function to the actuator plate 241, the bias element 248, and the piston elements 260, respectively, as described above with respect to FIGS. 3-24. Therefore, portions of the actuator plate 341, the bias element 348, and the piston elements 360 are described in detail herein. Furthermore, while the bias element 348 and the piston elements 360 are shown as having a specific size, in some embodiments, the bias element 348 and the piston elements 360 can have any suitable size without changing the function of the bias element 348 and/or the piston elements 360. Similarly, while the actuator plate 241 is described above with reference to FIGS. 11 and 12 as defining flow openings, in some embodiments, an actuator plate need not define flow openings. For example, the actuator plate 341 is devoid of fluid openings, but rather is sized to allow intake fluid flow through the clearance between the housing and the outer diameter of the actuator plate 341.

In use, the fluid transfer assembly 300 can be configured to be disposed, at least partially within the fluid reservoir 301 and be configured to transfer a portion of the fluid within the interior volume of the reservoir 301 to a volume outside the reservoir 301. As described herein, the portion of the fluid can enter the cavity 331 of the fluid transfer assembly 300 via the notches 382 in the cover 381 and the set of fluid openings 384 in the lower plate 388. Upon actuation of the solenoid assembly 385, the piston elements 360 can be moved within the housing to pump the portion of the fluid, in a similar manner as described above with reference to the fluid transfer assembly 200. Thus, the fluid can be conveyed from within the reservoir 301 to a volume outside the reservoir 301.

In some embodiments, the in-tank arrangement of the fluid transfer assembly 300 allows a fluid flow pathway to be devoid of fittings, hoses, and/or additional structure through which the fluid travels before reaching the cavity 331. This arrangement eliminates a location (such as fittings, hoses, or passageways) within which air can become entrapped. This arrangement also reduces the likelihood of air entrapment within the pump itself. In some embodiments, fluid can flow through the solenoid before entering the cavity 331.

Figure 43:
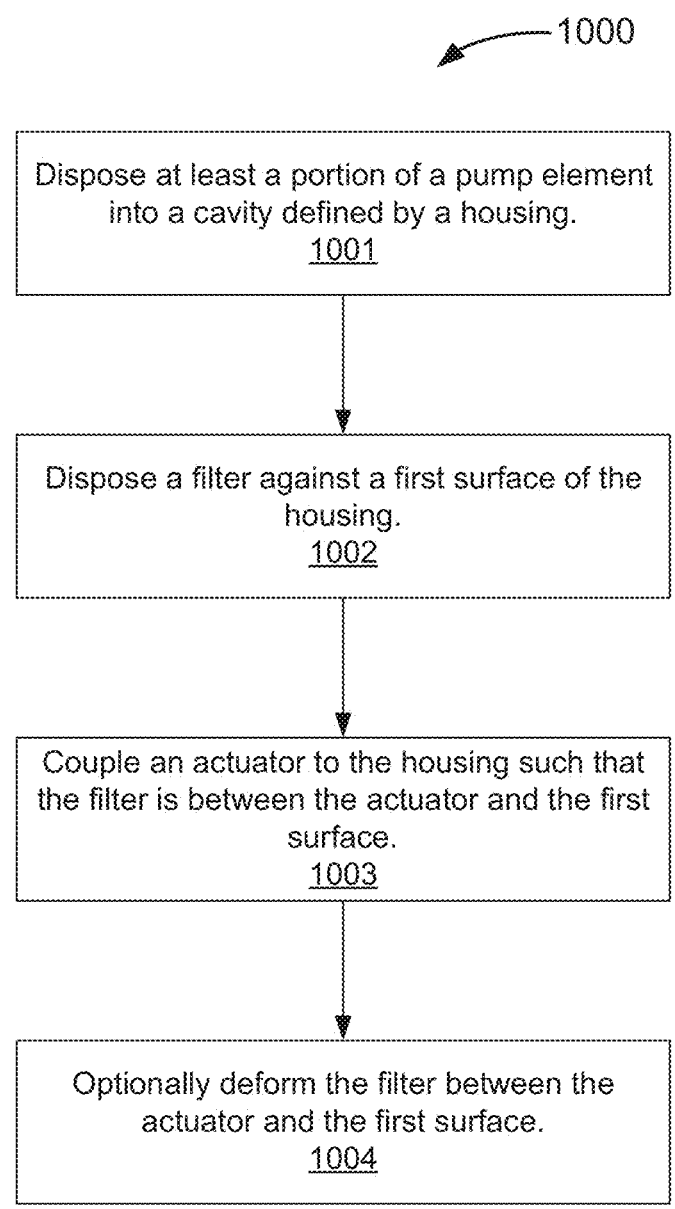
FIG. 43 is a flowchart illustrating a method of assembling a fluid transfer assembly, according to an embodiment.

FIG. 43 is a flowchart describing a method for assembling a fluid transfer assembly. In some embodiments, a method 1000 includes disposing at least a portion of a pump element into a cavity defined by a housing, at 1001. In some embodiments, the housing can be substantially similar to those described herein. In this manner, the cavity defined by the housing can be one of a set of cavities defined by the housing. In some embodiments, the pump element is configured to be disposed below a first surface of the housing (e.g., disposed within a recess defined by the first surface).

The method includes disposing a filter against the first surface of the housing, at 1002. In some embodiments, at least a portion of the filter can be disposed within a groove defined by the first surface of the housing. In other embodiments, the filter can rest on a substantially flat portion of the first surface. In still other embodiments, the filter can be coupled to the first surface. For example, in some embodiments, the filter can be screwed to the first surface. In other embodiments, the filter can be coupled to the first surface via an adhesive. With the filter disposed on the first surface, the method further includes coupling an actuator to the housing such that the filter is disposed between the actuator and the first surface. For example, in some embodiments, the actuator is coupled to a flat portion of the first surface and the pump element is disposed within a recess. In such embodiments, the filter can be a flat membrane style filter configured to be disposed between the actuator and the first surface and be disposed upstream of the pump element disposed within the recess of the first surface. For example, in some embodiments, the first surface can include a set of mounting protrusions configured to receive a mounting portion of the actuator. In such embodiments, the filter can be an annular filter disposed between the space defined between the actuator and the first surface. In some embodiments, the method optionally includes elastically deforming the filter when the actuator is coupled to the first surface, at 1004. For example, in some embodiments, the filter is an annular filter and the actuator is coupled to mounting protrusions. In this manner, the filter can exert a reaction force in response to the force causing the filter to elastically deform. Therefore, the reaction force exerted by the filter can maintain the filter in contact with the actuator and the first surface.

The embodiments described herein permit a portion of the physical packaging of a fluid transfer assembly (e.g., an oil pump) to reside inside a reservoir (e.g., an oil tank). For example, the arrangement described herein can improve the efficiency of manufacturing by reducing the amount of plumbing and connections external to an oil tank. This arrangement can also reduce and/or eliminate air entrapment within an oil supply line during operation. The location of the oil pump within the oil tank, as described herein, can reduce the priming time during start-up. Moreover, low-temperature pumping performance is improved with due to heating of oil inside the tank. In this manner, the fluid transfer assembly described herein can reduce overall system cost, complexity, and assembly labor.

The embodiments, described herein can be used to transfer any suitable fluid. For example, in some embodiments, the fluid transfer assembly is configured to be disposed within a recess of an oil tank (e.g., a recreational vehicle, all terrain vehicle (ATV), snowmobile, dirt bike, watercraft, or the like). In such embodiments, the fluid transfer assembly can be used to transfer a portion of the oil contained with the oil tank to, for example, an engine included in the vehicle. In other embodiments, the fluid transfer assembly can be used to transfer kerosene, petroleum, water, coolant, and/or any other suitable fluid.

Figure 44:
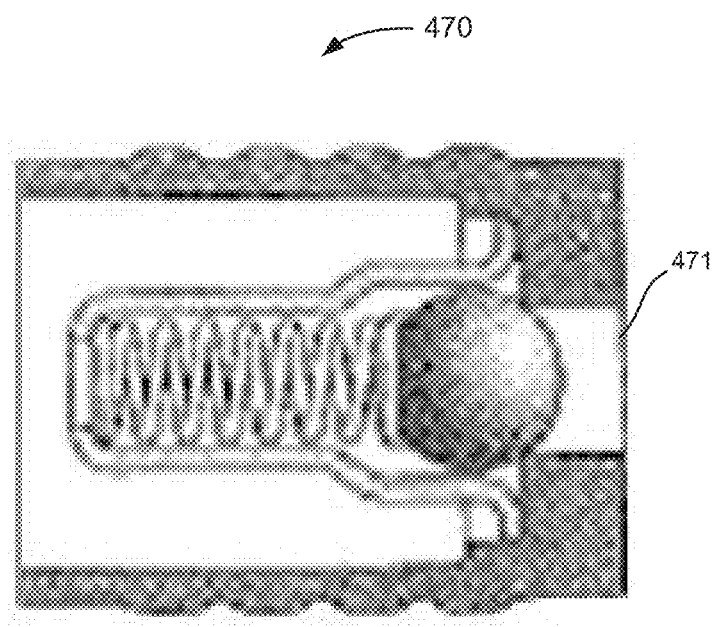
FIG. 44 is an illustration of a valve member, according to an embodiment.

As described above with respect to the fluid transfer assembly 200, in some embodiments, a piston element 260 includes a valve member 270 that can be a check valve. In some embodiments, the check valve can be any suitable type of check valve. For example, as shown in FIG. 44, a check valve 470 can be a ball and spring check valve. In such embodiments, the check valve can include a spring configured to maintain a ball against a surface of the check valve such that a fluid does not pass through a channel 471 when in the closed configuration. In use, such as, for example, in the fluid transfer assemblies described herein, a pressure within a pump chamber can be increased such that the spring is compressed and the ball disengages the surface of the check valve, thereby by placing the check valve in the open configuration. In this manner, the fluid can flow through the channel 471 to a volume substantially downstream from the ball. In other embodiments, a fluid transfer assembly can include any suitable check valve such as, for example, a diaphragm check valve, a swing check valve, a stop-check valve, a lift-check valve, and/or any other suitable valve. In some embodiments, the valve member is a valve other than a check valve.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made. For example, while the piston bores 233 are described above with reference to FIG. 8 as being arranged with alternating diameters $D_2$ and $D_3$, the piston bores 233 need not be arranged with alternating diameters. Similarly stated, while the piston bores 233 are shown having a diameter different than the two adjacent piston bores 233, in some embodiments, the diameter of adjacent piston bores 233 can be such that a piston bore 233 with diameter $D_2$ is adjacent to a piston bore 233 with diameter $D_2$ and adjacent to a piston bore with diameter $D_3$. Accordingly, a piston bore 233 with diameter $D_3$ is adjacent to a piston bore 233 with diameter $D_3$ and adjacent to a piston bore with diameter $D_2$.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified.

Although various embodiments have been described as having particular features and/or combinations of components, other embodiments are possible having a combination of any features and/or components from any of embodiments as discussed above.

What is claimed is:

1. An apparatus, comprising:
   a housing configured to be coupled to a reservoir containing a fluid such that a first surface of the housing is in fluid communication with an interior volume of the reservoir, the housing including a seal portion configured to fluidically isolate the first surface from a second surface of the housing when the housing is coupled to the reservoir, the housing defining a cavity between the first surface and the second surface; and
   a pump element, the pump element including a piston at least partially disposed within the cavity such that movement of a portion of the pump element within the cavity produces a flow of the fluid from an inlet opening defined by the first surface to an outlet opening defined by the second surface, the piston including a sealing portion configured to contact a side wall of the housing defining the cavity when the piston reciprocates within the cavity to produce the flow,
   the first surface of the housing includes a mounting portion configured to be coupled to an actuator, the actuator configured to move the portion of the pump element, the mounting portion configured to retain a filter in a position upstream from the inlet opening.

2. The apparatus of claim 1, wherein:
   the cavity is a first cavity; and
   the housing defines a second cavity between the first surface and the second surface, the second cavity configured to receive an electrical member configured to electrically couple the actuator disposed within the interior volume to a power source outside of the interior volume.

3. The apparatus of claim 1, wherein the housing is monolithically constructed.

4. The apparatus of claim 1, wherein the cavity is a cavity from a plurality of cavities defined by the housing between the first surface and the second surface, the apparatus further comprising:
a pump assembly including a plurality of pump elements, the pump element being a first pump element from the plurality of pump elements, each pump element from the plurality of pump elements configured to move within a corresponding cavity from the plurality of cavities.

5. An apparatus, comprising:
a housing configured to be coupled to a reservoir containing a fluid such that a first portion of the housing is disposed within the reservoir and a second portion of the housing is disposed outside of the reservoir, the housing including a seal portion configured to fluidically isolate the first portion from the second portion when the housing is coupled to the reservoir, the housing defining a cavity;
a pump element, the pump element including a piston and an actuation portion, the piston at least partially disposed within the cavity such that movement of a portion of the pump element within the cavity produces a flow of the fluid from an inlet opening defined by an inlet surface of the first portion to an outlet opening defined by the second portion, the piston including a sealing portion configured to contact a side wall of the housing defining the cavity when the piston reciprocates within the cavity to produce the flow;
an actuator configured to move the piston of the pump element, the actuator coupled to the first portion of the housing such that the actuation portion of the pump element is in contact with a mounting portion of the actuator; and
a filter, the actuator coupled to the first portion of the housing such that the filter is disposed between the actuator and the inlet surface.

6. The apparatus of claim 5, wherein the first portion of the housing includes a mounting surface configured to be coupled to the actuator.

7. The apparatus of claim 5, wherein the first portion of the housing includes a mounting surface configured to be coupled to the actuator such the actuator is offset from the inlet surface.

8. The apparatus of claim 5, wherein a portion of the filter is disposed within a groove defined by the inlet surface.

9. A method, comprising:
disposing a at least a portion of a pump element into a cavity defined by a housing, the cavity extending from an inlet opening defined by a first surface of the housing to an outlet opening defined by a second surface of the housing, the pump element is a piston including a sealing portion configured to contact a side wall of the housing defining the cavity when the piston reciprocates within the cavity to produce a fluid flow;
disposing a filter against the first surface of the housing; and
coupling an actuator to the housing such that the filter is disposed between the actuator and the first surface.

10. The method of claim 9, wherein the disposing the filter includes disposing a portion of the filter within a groove defined by the first surface of the housing.

11. The method of claim 9, wherein the coupling the actuator includes deforming the filter between the actuator and the first surface.

* * * * *